(12) United States Patent
Roaldsnes et al.

(10) Patent No.: US 11,382,318 B2
(45) Date of Patent: Jul. 12, 2022

(54) SYSTEM, APPARATUS, AND METHOD FOR TRAWL HANDLING

(71) Applicant: Stø Technology AS, Hareid (NO)

(72) Inventors: Pål Arne Roaldsnes, Valderøya (NO); Jan Børge Vik, Ålesund (NO)

(73) Assignee: Stø Technology AS, Hareid (NO)

( * ) Notice: Subject to any disclaimer, the term of this patent is extended or adjusted under 35 U.S.C. 154(b) by 0 days.

(21) Appl. No.: 16/633,669

(22) PCT Filed: Apr. 27, 2018

(86) PCT No.: PCT/NO2018/000009
§ 371 (c)(1),
(2) Date: Jan. 24, 2020

(87) PCT Pub. No.: WO2019/022612
PCT Pub. Date: Jan. 31, 2019

(65) Prior Publication Data
US 2020/0229412 A1    Jul. 23, 2020

(30) Foreign Application Priority Data

Jul. 24, 2017   (NO) .................................. 20171224

(51) Int. Cl.
*A01K 73/02* (2006.01)
*B63G 8/00* (2006.01)
*B63G 8/42* (2006.01)

(52) U.S. Cl.
CPC .............. *A01K 73/02* (2013.01); *B63G 8/001* (2013.01); *B63G 8/42* (2013.01); *B63G 2008/007* (2013.01)

(58) Field of Classification Search
CPC .......... A01K 73/02; A01K 73/20; B63G 8/00; B63G 8/001; B63G 8/42; B63G 2008/007;
(Continued)

(56) References Cited

U.S. PATENT DOCUMENTS 2,890,543 A   6/1959 Mitchell
3,987,745 A   10/1976 Chaverebiere de Sal et al.
(Continued)

FOREIGN PATENT DOCUMENTS

FR    1399321 A   5/1965
JP    2000-217465 A   8/2000
(Continued)

OTHER PUBLICATIONS

International Search Report issued in Application No. PCT/NO2018/000009, dated Jan. 23, 2019 (4 pages).
(Continued)

*Primary Examiner* — Lars A Olson
(74) *Attorney, Agent, or Firm* — Osha Bergman Watanabe & Burton LLP

(57) ABSTRACT

A catch handling system includes a catch collection system. The catch collection system includes one catch handling depot; one or more trawls; and a catch transport system, where the catch transport system includes a transport system, and where the transport system includes a transport node. The transport node includes a releasable connection to a catch handling fleet carrier drone and to one or more units of a catch handling fleet.

16 Claims, 21 Drawing Sheets

(58) Field of Classification Search
CPC ........ B63H 11/00; B63H 21/00; B63H 21/38; B63B 35/00; B63B 35/14; B63B 35/20
USPC ........................................................ 114/255
See application file for complete search history.

(56) References Cited

U.S. PATENT DOCUMENTS

| | | | | |
|---|---|---|---|---|
| 6,138,397 | A | * | 10/2000 | Hammersland ........ A01K 73/04 |
| | | | | 114/255 |
| 2005/0160656 | A1 | * | 7/2005 | Safwat ................. A01K 73/045 |
| | | | | 43/9.95 |
| 2013/0305975 | A1 | | 11/2013 | Fuhr |

FOREIGN PATENT DOCUMENTS

| NO | 162211 B | 8/1989 |
|---|---|---|
| RU | 2275021 C2 | 4/2006 |
| WO | 8202645 A1 | 8/1982 |
| WO | 2010/015254 A1 | 2/2010 |
| WO | 2017/048134 A1 | 3/2017 |

OTHER PUBLICATIONS

Written Opinion issued in International Application No. PCT/NO2018/000009, dated Jan. 23, 2019 (8 pages).
International Preliminary Report on Patentability issued in Application No. PCT/NO2018/000009, dated Nov. 22, 2019 (92 pages).
Search Report issued in Norwegian Application No. 20171224, dated Feb. 13, 2018 (2 pages).
Search Report issued in Russian Application No. 2020105622/12; dated Aug. 30, 2021 (2 pages).

\* cited by examiner

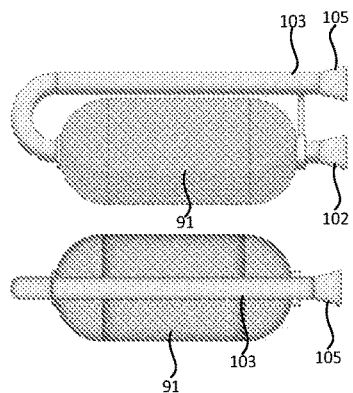
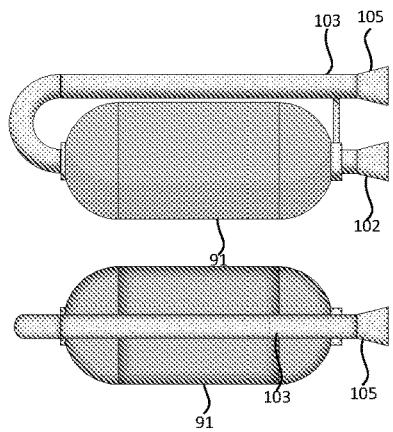
Fig 11   Fig 12
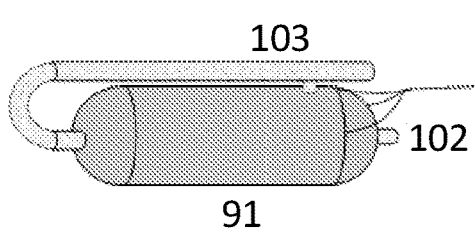
Fig 13
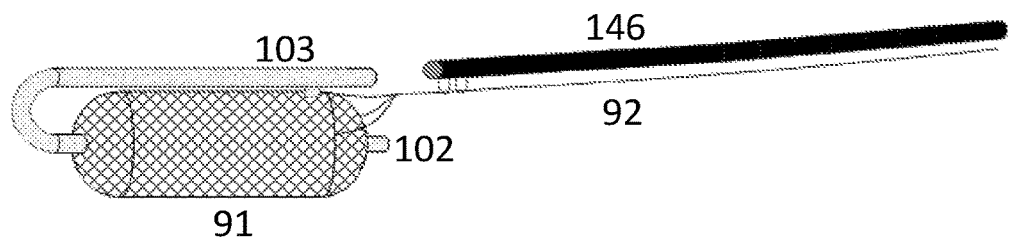
Fig 14
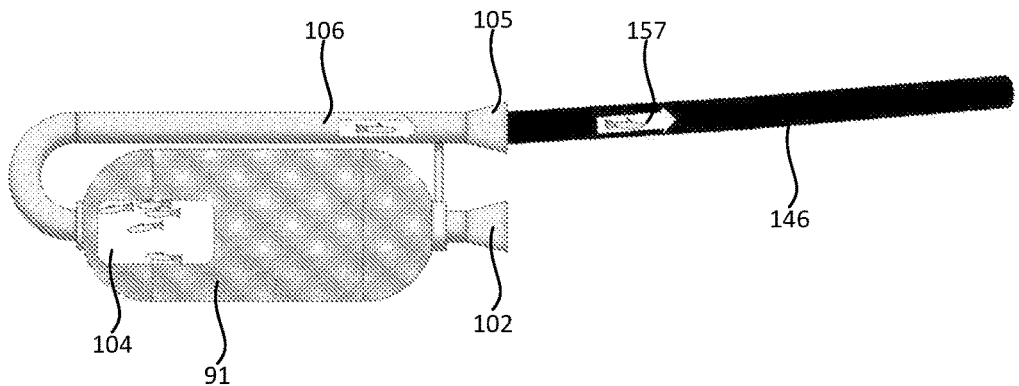
Fig. 15

US 11,382,318 B2

SYSTEM, APPARATUS, AND METHOD FOR TRAWL HANDLING

TECHNICAL FIELD

The present invention relates to a catch handling fleet comprising units for collecting, transporting and processing catch.

BACKGROUND ART

In conventional trawling, regardless of whether the vessel or vessels (in case of pair trawling) is/are towing one or more trawls, all gear and operating time in fishing relies on that the trawl(s) is/are hauled into the vessel to collect the catch gathered in the cod end. The time spent on such hauling is time during which the machinery of the ship runs idle not performing active fishing. Also, each hauling causes considerable wear to the trawling gear.

The size of the equipment and the number of trawls used for fishing are limited by the fact that each trawl has to be able to be pulled onboard the towing vessel to enable the catch to be collected.

This imposes a limitation on the number of hauls in a 24-hour period to avoid an unnecessary long operating time with no fishing, but also to reduce wear and improve the safety of the deck crew. As a consequence of this, a substantial part of the catch eventually pulled onboard has spent a considerable amount of time at the bottom of the cod end, increasing the risk of dead and pressure injuries to the individuals of the catch caught at the beginning of the cycle. The quality of the catch is further deteriorated by pulling the cod end dry and compacted up the slip at the stern of the vessel. The catch can be left on the slip for several minutes before it is introduced into reception tanks awaiting processing.

It is an object of the present invention to solve the above problems associated with current trawling systems.

SUMMARY OF THE INVENTION

The above indicated problems are solved according to the present invention by providing a collection system comprising at least one depot, at least one trawl, at least one of said trawls comprising a coupling means for releasable connection to a transport bag, said releasable connection being adapted for the transport of trawl contents to a transport bag, said coupling means being releasably connected to the transport bag. In an embodiment, the coupling means, together with the transport bag, can be maneuvered to the at least one vessel.

The coupling means, together with the transport bag, can be connected to the vessel in order to empty the contents of the transport bags. According to an aspect of the invention, the Further advantages of the present invention will become apparent from the accompanying patent claims.

BRIEF DESCRIPTION OF THE DRAWINGS

The present invention will be more easily understood by referring to the attached drawings, in which FIG. 11 shows a recovery bag 91 made of a partly permeable material, FIG. 12 shows a recovery bag 91 made of a non-permeable material, FIG. 13 shows a recovery bag 91 with towing means and unload piping, FIG. 14 shows a recovery bag 91 made of a material that allows free water flow-through, and further shows an unloading hose/pipe for connection to the unload piping 103 of the recovery bag, FIG. 15 shows emptying of a recovery bag 91 through a hose 146.

DETAILED DESCRIPTION OF THE INVENTION

Figure 1:
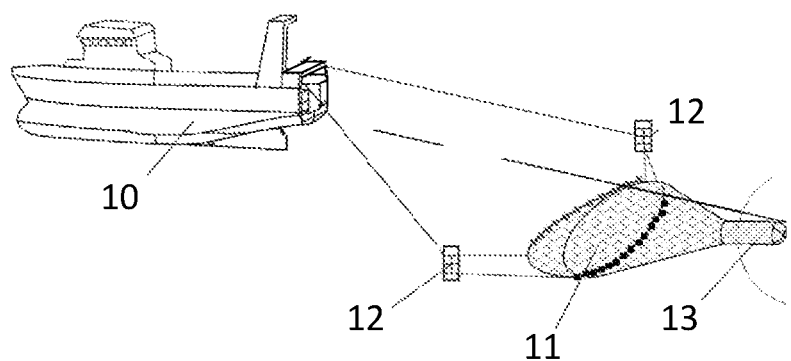
FIG. 1 shows one fishing vessel 10 trawling using a single trawl 11 having a cod end 13 according to prior art.

The present invention will now be described in more detail with reference to the attached drawings.

Terms used repeatedly throughout the patent application:

Catch, by the term catch is meant both live and dead objects catchable by means of catching equipment that a catch handling fleet 1 according to the present invention is able to catch and possibly process. Typically, catch may consist of fish, marine animals, and waste catchable using a trawl.

Fleet, in this application, shall refer to two or more vessels operating together to solve a common task such as collecting and handling catch.

The terms line, cable, wire, or rope are used interchangeably throughout the specification. It is to be understood that a line, cable, wire, or rope may all function as a power and/or signal cable.

The present invention discloses a catch handling fleet 1 comprising one or more catch handling systems 2. Each catch handling system 2 may include one or more catch collection systems 3 and one or more recovery bags 91. The catch collection systems, in turn, include one or more catch transport systems and one or more trawl vessels. The catch transport systems may consist of one or more transport systems 5 and one or more carrier drones 107. Each transport system 5 includes at least a transport node 251 and a transport bag 101.

Figure 2:
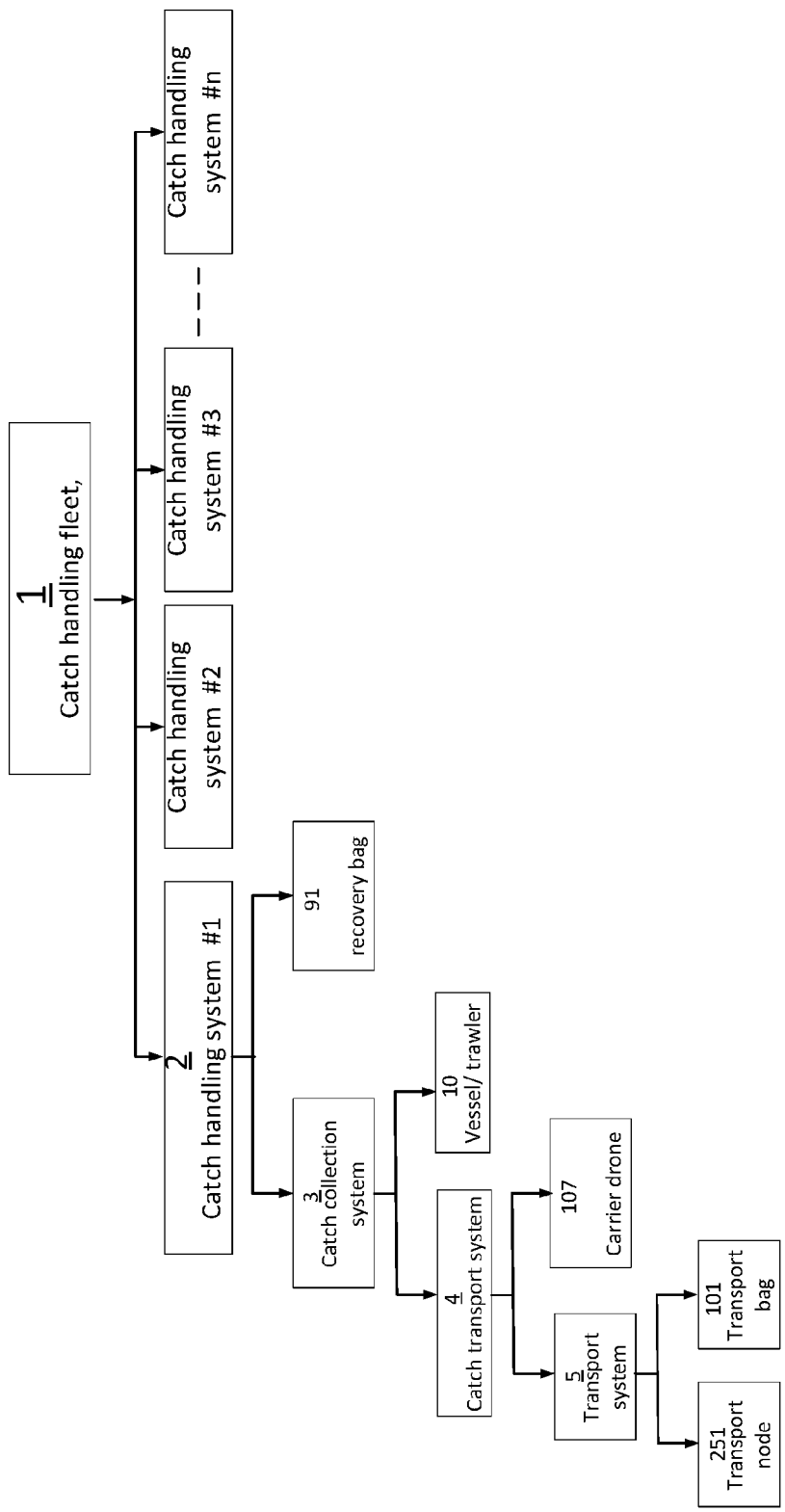
FIG. 2 shows elements and subsystems comprised by a catch handling fleet according to the present invention.

Hence, it is to be understood that the present invention relates to a complete catch handling fleet with all the individual elements of the fleet enabling the collection and handling of catch. Catch handling fleet 1 and the subelements thereof are illustrated hierarchically in FIG. 2.

In other words, catch handling fleet 1 comprises a plurality of subsystems each comprising a number of modules.

The object of the catch handling fleet 1 provided according to the present invention is to provide automated or semi-automated handling of catch, transportation of catch, loading and unloading of catch.

An element of a catch handling fleet 1 is a carrier drone 107 that may be fully or partially autonomous, which carrier drone is a «busy bee» in the catch handling fleet 1 that transports transport systems 5 and other equipment within catch handling fleet 1. Catch handling fleet 1 may include several carrier drones 107.

In the following, the individual elements of catch handling fleet 1 will be described in more detail, referring to the drawings where applicable in order to facilitate the understanding of the invention and all the aspects thereof.

FIG. 1 shows a trawl vessel 10 with a trawl 11 and associated trawl equipment in accordance with prior art. It can be seen that the trawl vessel is towing the trawl from its aft end, with the tow being performed via two otter boards 12. The most important function of otter boards 12 is to keep trawl 11 open so that the catch can enter into the trawl and then into a cod end 13. When cod end 13 is full, or when the person in charge of the trawling decides to do so, trawl 11 will be pulled in towards the ship 10 and into a slip on trawl vessel 10. The catch will be processed onboard the ship 10. After trawl 11 has been emptied, it can be lowered via the slip to continue the catching provided that the trawl has not suffered any damage during the retrieval of the trawl.

Figure 3:
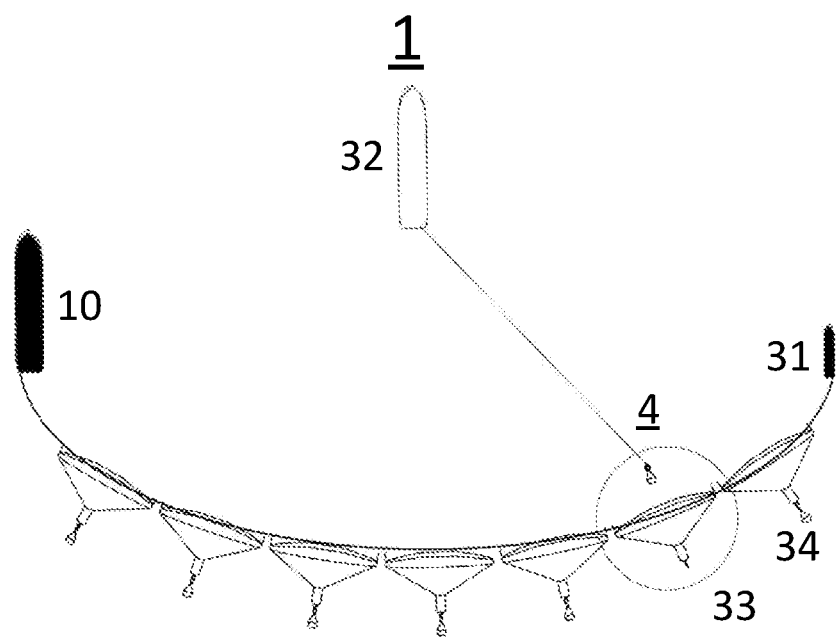
FIG. 3 shows a catch handling fleet comprising several vessels and several trawls as well as at least one catch transport system.

FIG. 3 shows an exemplary catch handling fleet 1, comprising several vessels. A trawl vessel 10 is trawling cooperatively with a pair trawl vessel 31. Pair trawl vessel 31 may be a remotely controlled, unmanned pair trawl vessel. The pair trawl vessel may be autonomous, semi-autonomous or, as mentioned, be controlled from another vessel of the catch handling fleet 1.

Catch handling fleet 1 may further include one or more ships 32 for receiving catch. Of course, the trawl vessel 10 and/or pair trawl vessel may also include means for receiving catch. However, the use of a separate ship 32 for receiving catch, such as a factory ship, offers particular advantages in a catch handling fleet according to the present invention, because, according to the present invention, it is not necessary to haul in trawls as they fill up. That is, according to the present invention, means are provided for emptying trawls through a valve at the tail of the cod end, as seen relative to the opening of the trawl. According to the present invention, one or more separate ships 32 for receiving catch may «shuttle» between the catch reception point and catch handling fleet 1 for receiving new catch.

In FIG. 3 a catch transport system 4 is towed by a ship 32 for receiving catch. The catch transport system 4 in the figure includes a transport bag that can be filled with catch. Catch transport system 4 can be heading towards a trawl 33. Catch transport system 4 can be maneuvered towards a terminal end of a cod end having a cod end adapter with an open-and-close valve either autonomously or via towing line from the vessel 32 in combination with maneuvering means of a transport component of catch transport system 4. Details of the catch transport system will be discussed in more detail below. After the catch transport system has been guided to an opening such as a valve at the trailing end of a targeted cod end, then catch transport system 4 or a component of the catch transport system that includes a transport bag may be connected mechanically to the terminal end of the cod end via, for example, a dump valve—an open/close valve. FIG. 3 shows seven trawls, six of which are provided with a transport bag having means for connection to the cod end coupled to the cod end. The above-mentioned transport component forming part of catch transport system 4 may, for example, be disconnected from the transport bag after the transport bag, by way of the coupling means thereof, has been coupled to the terminal end of a cod end. The transport component may then be guided towards certain cod ends to decouple transport bags containing catch from the respective cod ends thereof and then transport these towards the ship 32 for receiving catch. Alternatively, transport bags with or without coupling means can be pulled directly to the ship 32 for receiving catch by way of line. The line may be attached to the transport bag by means of the transport component, and may have been attached at the time of connection of the transport bag to the cod end.

Figure 4:
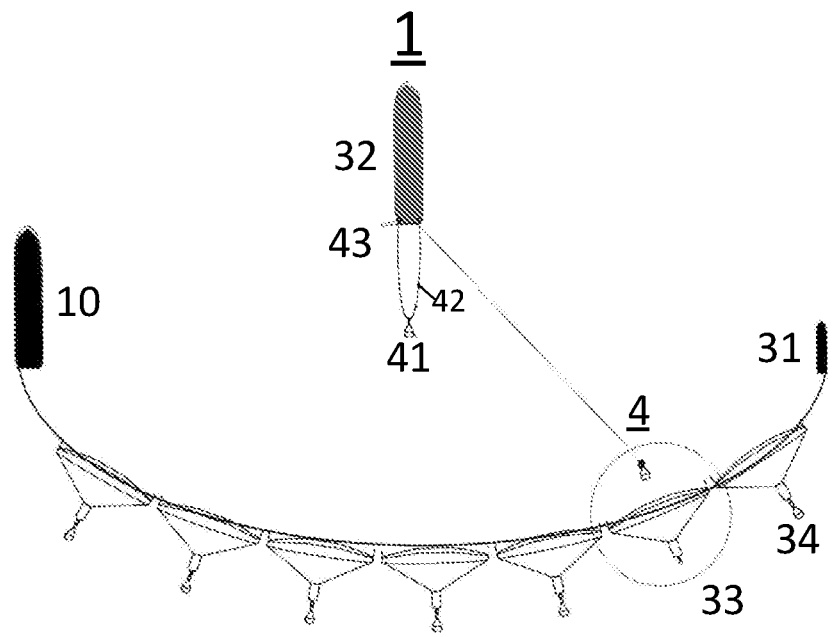
FIG. 4 shows a catch handling fleet 1 comprising several vessels and several trawls as well as at least one catch transport system.

FIG. 4 shows a variant embodiment of a catch handling fleet 1 comprising, as seen in FIG. 4, means for handling catch transport system 4, which does not form part of the catch handling fleet shown in FIG. 3, said means being connected at the stern of the ship 32 for receiving catch. As in FIG. 3, a trawl 33 having a cod end adapter is «waiting» for a catch transport system 4.

A transport bag 41 is towed behind the catch reception ship 32 via a carrier line 42. Carrier line 42 is shown engaged with two winches 43, one at each side of the stern. The combination of carrier line 42 and the two winches allows the transport bag 41 to be alternatingly pulled in towards starboard and port sides. More complex winching systems are conceivable so that transport bags can be guided towards, for example, openings on starboard or port side of the ship.

The ships 10, 31, and 32 shown in FIG. 4 can be fully or partially autonomous as indicated for FIG. 3. Also, the catch reception ship shown may be «exemplary» of a plurality of catch reception ships shuttling to pick up catch.

Figure 5:
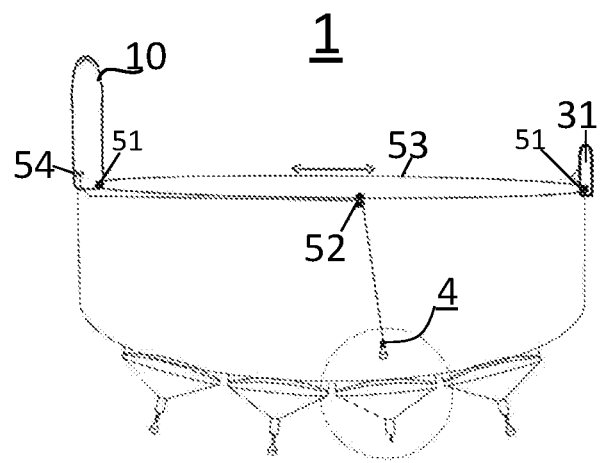
FIG. 5 shows a catch handling fleet comprising several vessels and several trawls as well as at least one catch transport system 4 in a different configuration from those shown in FIGS. 3 and 4.

FIG. 5 shows still another exemplary catch handling fleet 1 including a roundsling system for maneuvering a catch transport system 4. The catch handling fleet includes one trawling ship 10 as well as a pair trawl vessel 31. The pair trawl vessel may be remotely controlled from trawl vessel 10, may be manned, or may be autonomous, in the same manner as discussed for the other embodiments of a catch handling fleet 1.

Catch handling fleet 1 of FIG. 5 includes four trawls, for which one of the cod ends not being connected to a transport bag by connecting means. The third trawl from the left hand side is waiting for a catch transport system having a transport bag with coupling means for connection to the cod end.

Trawl vessel 10 is provided with a winch 51, as is pair trawl vessel 31, which winches 51 pull a roundsling 53 having mounted thereon a guiding block 52 for positioning catch transport system 4 between the trawls of catch handling fleet 1 shown in FIG. 5. A winch 54, in this case mounted at the stern of trawl vessel 10, can winch the catch transport system «in and out», that is, back and forth between vessels 10, 31 in the figure, while the roundsling and guiding block 52 control the positioning between the trawls.

Figure 6:
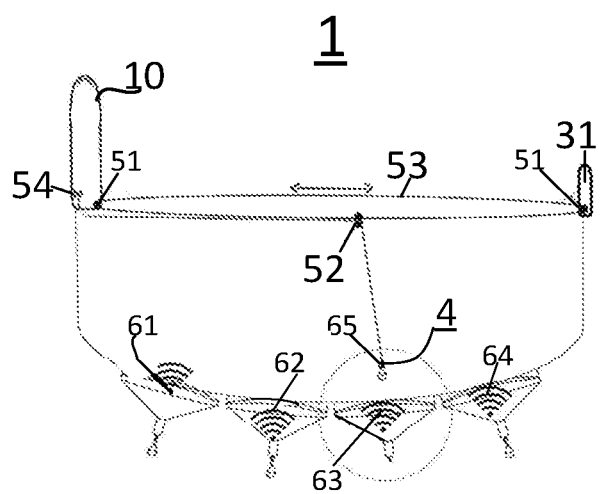
FIG. 6 shows a catch handling fleet 1 comprising several vessels and several trawls as well as at least one catch transport system 4, with the catch handling fleet of this figure including wireless and/or wired communication means, one or more cameras or camera systems and possibly also sensors.

FIG. 6 shows a catch handling fleet 1 that, from a mechanical viewpoint, is similar to that shown in FIG. 5. FIG. 6 differs from FIG. 5 in that the system is provided with sensors, communication means, and/or camera systems. In an example, catch handling fleet 1 of FIG. 6 is provided with cameras or camera systems 61, 62, 63, and 64. Catch transport system 4 can be provided with a high-speed wireless network router 65, or a wired network router 65. One or more wired routers may be connected via the lines/cables shown in the figure. Network router 65 could be an Ethernet router.

Communication may also be accomplished by way of audio based communication to and from the «transport component» of catch transport system 4.

Systems like those shown in FIG. 6 may be combined with sensor systems and additional camera systems communicating with crew on vessels of catch handling fleet 1 or with onshore staff. For example, the cameras can indicate the filling level of trawls, and may provide information on the conditions of trawls and cod ends as well as of other parts of catch handling fleet 1 monitored by the cameras.

Catch handling fleet 1 as shown in FIGS. 3-4 may also be combined with communication and camera systems as shown in FIG. 6.

Figure 7:
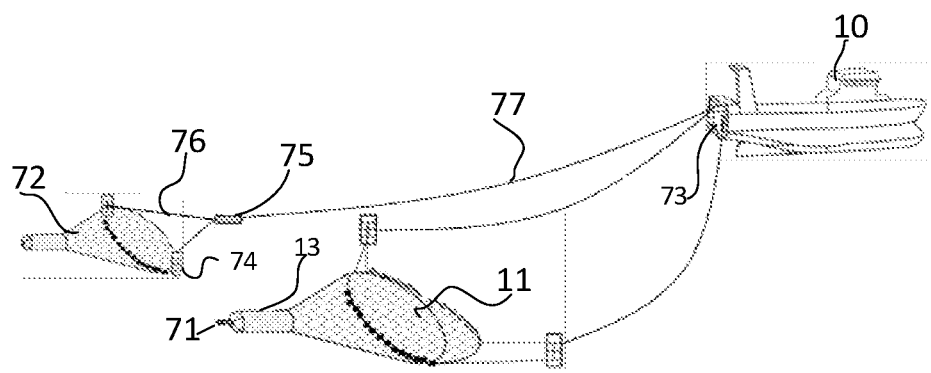
FIG. 7 shows an autonomous collection trawl 72.

FIG. 7 shows a collection trawl 72. Collection trawl 72 may be let out behind the trawl vessel 10 via a slip 73 or trawl hangar below the waterline (not shown in FIG. 7). Besides the mini trawl 72 itself, the complete tow may also include two smaller otter boards 74 for opening and closing the autonomous collection trawl 72, a navigation and maneuvering node 75, board wire(s) 76 between otter boards 74 and navigation node 75, as well as one or more main wires 77 attached to trawl vessel 10. The wires 76 connecting navigation node 75 to otter plates 74 may be reeled in and out in navigation node 75, so that the trawl is either extended as shown in FIG. 7 or is completely or partially collapsed as shown in FIG. 8.

In the same manner as indicated above for catch transport system 4 having a transport bag, a mini trawl 72 may be used for collecting catch from trawls for subsequent delivery to a vessel of a catch handling fleet 1.

Figure 8:
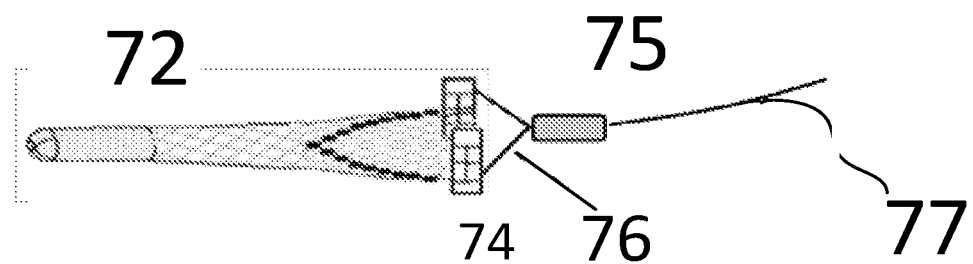
FIG. 8 shows the autonomous collection trawl 72 in a partially collapsed configuration.

Referring to FIGS. 7 and 8, main wire 77, being in mechanical communication with maneuvering node 75, may position an unexpanded tow (unexpanded mini trawl 72) as shown in FIG. 8 behind a cod end 13 of a main trawl 11. When the tow is in place, navigation node 75 may unreel wire 76 of otter boards 74 so that mini trawl 72 opens (FIG. 7). An open/close valve is provided at the rear end of cod end 13. The open/close valve may be an acoustically controlled dump valve 261 that discharges catch at said rear end into the waiting mini trawl 72 when signaled by the ship 10.

Figure 9:
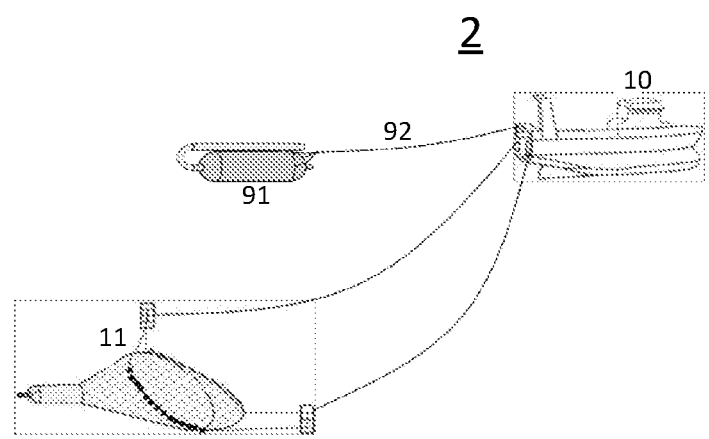
FIG. 9 shows a catch handling system 2 comprising trawls, recovery bag 91, and trawl 11.

FIG. 9 shows a catch handling system 2 including a recovery bag 91. Recovery bag 91 can be used for intermediate storage of catch. In one scenario catch is gathered by a catch transport system 4 including transport bags, after which catch from the transport bags can be transferred to recovery bags 91 towable behind a ship 10. Recovery bags 91 may be suitable habitats for storing live catch transferred from transport bags. According to the present invention, as indicated above, the condition of catch is significantly more controllable and the yield of uninjured live catch from a catch handling fleet 1 according to the present invention can be significantly improved as compared to conventional trawl systems (see FIG. 1). Of course, recovery bags 91 may also be used as intermediate storage for waste and other caught objects collected by a catch handling fleet 1. In one embodiment, recovery bags 91 may be emptied through a pipe connection to a vessel 10, for example. In FIG. 9 a catch handling system 2 is shown, which may be one of several such systems of a catch handling fleet. In FIG. 9 a trawl vessel pulls a tow including a trawl 11, which trawl 11 is provided with a cod end having a cod end adapter for emptying the contents of the trawl via the cod end adapter at the closed terminal end of the cod end.

It is to be understood that recovery bags 91 can be left behind by a catch handling fleet to be towed/picked up by a vessel that does not necessary belong to the same fleet as recovery bags 91. For example, if the recovery bag stores dead matter such as waste, for example, a specialized waste handling ship can be used for collecting and handling the waste.

Similarly, recovery bags containing live catch can be picked up by vessels able to deliver live catch to fish farms or reception facilities adapted for receiving live catch.

Of course, the catch handling fleets 1 shown in FIGS. 3-6 may be combined with one or more recovery bags 91.

Figure 10:
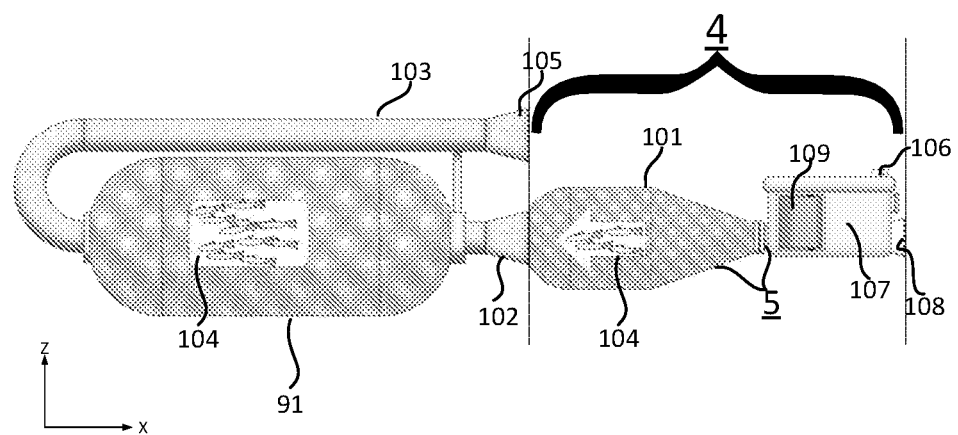
FIG. 10 shows a catch transport system 4 comprising a carrier drone 107 and a transport system 5 containing catch coupled to a recovery bag 91.

FIG. 10 shows an assembly of a recovery bag 91 and a catch transport system 4. For illustration purposes, the recovery bag 91 shown has been provided with a window in which live catch in the form of fish 104 is depicted. A similar «window» is shown in a transport bag 101 in the figure. The windows are only included for the purpose of illustration.

Recovery bag 91 is shown with piping 103 for unloading/ pumping of catch. A first end/nozzle 105 of the piping includes an adapter adapted for connection to unloading means such as additional pipe or hose systems having additional couplings for releasable connection to nozzles 103 of piping 103 of recovery bag 91.

In the figure, recovery bag 91 is depicted with a «mesh-like» surface. The mesh-like surface illustrates that the bag can be made of an outer material allowing for flow-through of fluids. The aperture/mesh width can be determined based on the desired function/type of catch. The larger aperture the better replacement of oxygen and liquid, while on the other hand the flow-through in case of a coarse mesh width may become slightly high during towing for some types of catch.

Recovery bag 91 includes means for filling the bag 91. In the figure this is illustrated as a second nozzle 102. In the figure, a transport bag 101 is releasably engaged with the second nozzle 102 for emptying catch 104 contained in transport bag 101 into recovery bag 91. Transport bag 101 is provided with a close/open device at a second end adapted for the releasable connection to the second nozzle 102.

The recovery bag in the figure is elongated sausage-shaped, other shapes of course being conceivable.

Transport bag 101 has a first end adapted for releasable connection to first coupling means, the interconnected assembly of the transport bag 101 and first coupling means together forming what is referred to as a transport system 5. The first coupling means provides releasable connection at the first terminal end of cod end 101 and at the same time releasable connection to unloading systems and cod ends via a third nozzle/adapter 108. Further, the carrier drone 107 shown may be provided with means for releasable connection to the first coupling means.

In the figure, carrier drone 107 is shown surrounded by the first coupling means. The first coupling means will be discussed in more detail in the following description in a more particular implementation.

In the figure, carrier drone 107 is shown with fastening means in the form of a fastening eye 106. One or more such fastening means may be provided on carrier drone 107 in order to tie carrier drone 107 mechanically to remote units via a line, cable, wire, or rope. In one implementation of carrier drone 107, signal and power supply cables may be connected via said fastening means 106. The carrier drone is also shown with navigation means 109. In the figure, the navigation means is illustrated as a side rudder 109, but other implementations of navigation means are conceivable, such as directional thrusters or propellers.

Catch transport system 4 and recovery bag 91, according to a variant of the invention, can be transported as a single unit. In many cases, however, carrier drone 107 will be omitted, so that a unit including transport system 5 and recovery bag 91 remains.

FIG. 11 shows a sausage-shaped recovery bag 91 having a mesh-like surface in the same manner as shown in FIG. 10. The mesh-like surface indicates a surface allowing for flow-through of fluid. The upper part of FIG. 11 is a side view of the recovery bag as seen in an x-z plane, cf. FIG. 10. The bottom figure is a top view of the sausage-shaped recovery bag 91 projected to an x-y plane.

FIG. 11 shows the first nozzle 105 and the top figure also shows the second nozzle 102.

FIG. 12 is similar to FIG. 11, except that recovery bag 91 of FIG. 12 is shown with a surface that does not allow for flow-through of fluid. Such a fluid-tight bag 91 adequately isolates a catch inside the recovery bag 91 from the surroundings. Said catch may be dead matter, live matter, and said dead matter could also include fluids.

When FIGS. 11 and 12 show recovery bags having either a fluid-tight or an open surface, this is to illustrate the possibilities of adapting the surface of a recovery bag 91. The surface could be a combination of fluid-tight and meshed, being fluid-tight at the ends and having a surface allowing for flow-through in the center section, for example.

FIG. 13 shows a recovery bag 91 without all the details of FIGS. 10-12 included. The recovery bag can have a surface as indicated by FIGS. 10-12. In the figure, recovery bag 91 is provided with towing means 92. Towing means 92 may be a wire, cable, line, or rope and may comprise current and signal cables. Current and signal cables may be used, for example, for controlling open-and-close valves in connection with the nozzles of recovery bag 91.

FIG. 14 is generally similar to FIG. 13 but in this case the recovery bag is shown provided with a surface adapted for flow-through of fluid. Also seen is a hose 146 guided towards piping 103 of recovery bag 91 for connection to the piping via the first nozzle 105 (not shown in FIG. 14). Hose 146 may also be a pipe.

FIG. 15 shows that hose/pipe 146 is connected to first nozzle 105 of piping 103 of recovery bag 91.

For illustration purposes, a window has been created in the meshed surface of recovery bag 91, depicting catch 104, illustrated as live fish, without the catch being not limited to live fish. Further, the surface of recovery bag 91 could just as well have been a fluid-tight surface or a combination of fluid-tight and meshed/apertured.

The figure shows that catch 104 is pumped out of recovery bag 91 through piping 103 into pipe/hose 146, in which the catch is shown by reference numeral 157. Catch 104, 157 is pumped into a storage/reservoir/netpen in which it may be handled, such as a depot, trawl vessel, factory ship, recovery station, netpen, or any another suitable point of reception.

As indicated above, the nature of the catch will dictate the choice of receiver of the catch 104, 157 pumped out of recovery bag 91. Normally, the pumping means will be located at the receiving entity.

Figure 16:
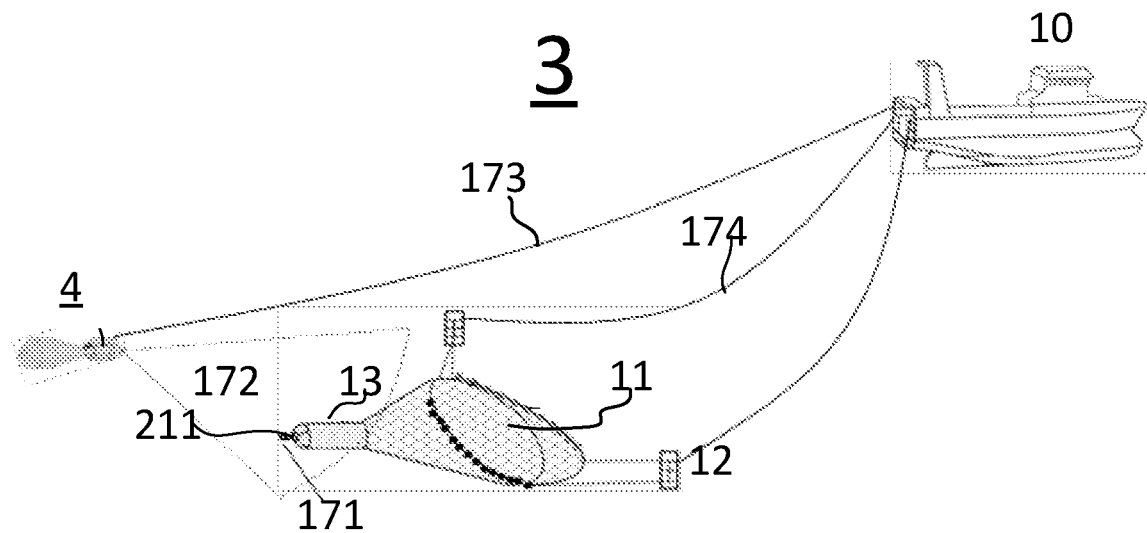
FIG. 16 shows a catch collection system 3 in which the catch transport system 4 is provided with a sonar device.

FIG. 16 shows a catch collection system 3 including a catch transport system 4 physically connected 173 to a depot 10, in the example shown as a trawl vessel 10. The figure also shows a trawl 11 having a cod end 13. Cod end 13 is provided with a rear nozzle 211 in the form of a cod end adapter for releasable mechanical connection to coupling means of catch transport system 4. Catch transport system 4 includes an autonomous and/or controlled carrier drone 107. Carrier drone 107, together with coupling means and transport bag, is towed by means of a probe cable 173. Carrier drone 107 is coarsely positioned behind a main trawl 11 based on position data obtained from sensors on trawl 11. Having been coarsely positioned, carrier drone 107 can activate a sonar device 172, such as a multibeam sonar, for example, in order to locate and identify a sonar beacon 171 associated with a cod end adapter 211. When the beacon has been identified, continuously acquired sonar data can be used for positioning carrier drone 107 gradually closer to cod end adapter 211, until physical interconnection can be accomplished. It is to be understood that the indication that the carrier drone is maneuvered for connection to cod end adapter 211 implies that the carrier drone in this case includes a payload in the form of the coupling means and transport bag, which together form a catch transport system 4.

Figure 17:
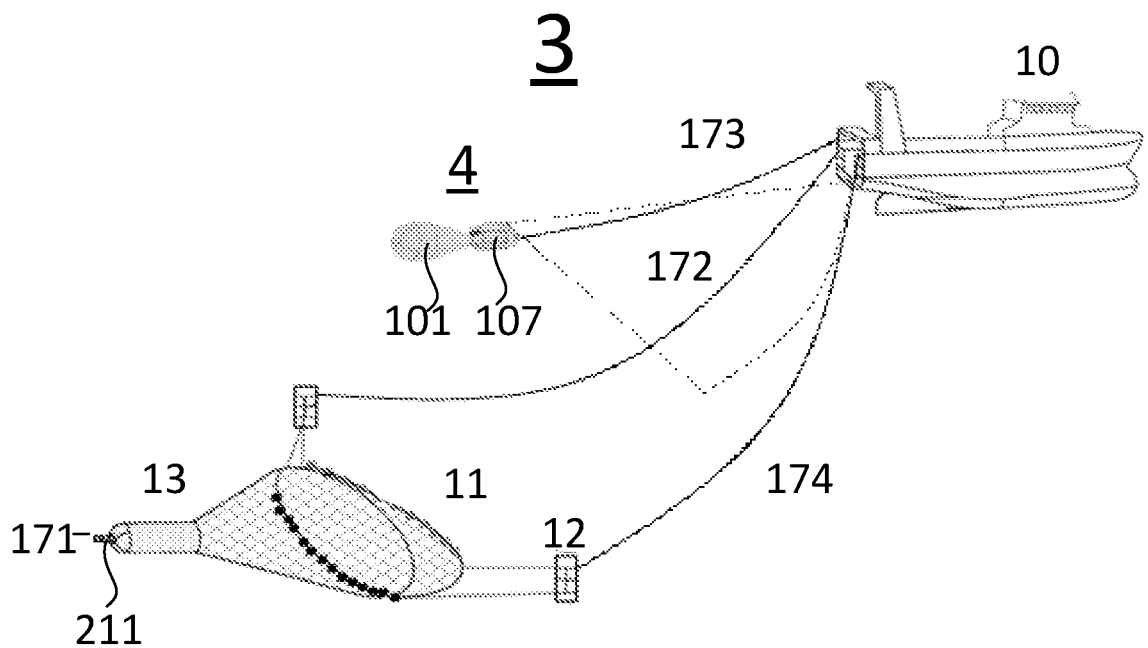
FIG. 17 shows the catch collection system 3 of FIG. 16, with the catch transport system 4 located at a different position.

FIG. 17 shows the same catch collection system 3 as FIG. 16, but the catch transport system 4 is in a different position relative to trawl 11. The figure shows catch transport system 4 including carrier drone 107 moves towards depot 10. Sonar device 172 is used actively in order to stay clear of obstacles in the sea, such as trawl wire 173, and to prevent collision with depot 10.

From the figure it is seen that catch transport system 4 is comprised by a transport bag 101 and a carrier drone 107. Carrier drone 107 surrounds first coupling means, which are in turn releasably connected to transport bag 101. The first coupling means are not shown in the figure.

The figure further shows a trawl 11 having otter boards 12 for steering, opening, and closing trawl 11. Trawl 11 is further provided with a cod end 13. Cod end 13, at the closed end thereof, is provided with a cod end adapter 211 configured for releasable connection to the first coupling means.

The figure further shows towing means in the form of wires/lines/ropes/cables. A towing means 173 is connected between a vessel 10 and catch transport systems 4. The towing means may be a entirely passive line, rope, or wire or be a combination of an electric power and signal cable and a towing means 173. The figure further shows that trawl 11, via the otter boards 12 thereof, is provided with towing means 174.

Figure 18:
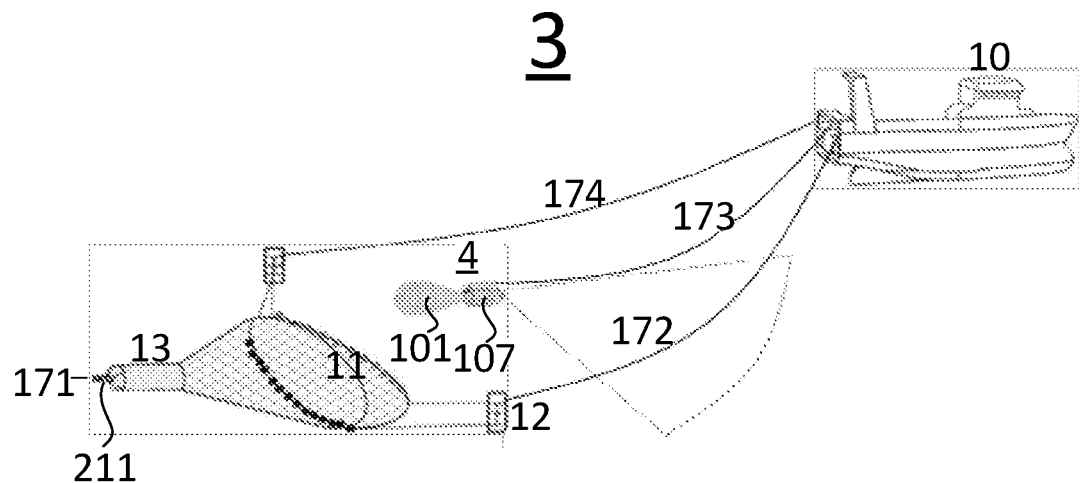
FIG. 18 shows the catch collection system 3 of FIGS. 16 and 17, with the catch transport system 4 located at a different position.

FIG. 18 shows a catch collection system 3 in a manner similar to FIGS. 16 and 17, containing the same elements. The figure shows the manner in which catch transport system 4 with carrier drone 107, by means of an active sonar device 172, are able move safely forward from a rear position as described in FIG. 16 and over a main trawl 11 to a position in front of trawl 11, between trawl wires 173.

FIGS. 16 to 18 show a catch transport system 4 being hauled in. In many cases carrier drone 107 will not take part in such hauling, as the carrier drone 107, which may be the only carrier drone of a catch handling fleet, can be better used for other purposes than being a «passenger» on a transport system 5.

In a scenario as indicated above with reference to FIGS. 16-19, hauling of catch is shown. However, deploying a catch transport system 4 with a drone 107 is at least as realistic as the maneuvering features of carrier drone 107 can then be exploited to a greater extent than in the case of hauling. For such at scenario FIGS. 16-18 show an autonomous and/or controlled carrier drone 107 being launched behind a depot/ship 10 and towed by means of a probe cable 173. The carrier drone surrounds first coupling means, which is in turn releasably connected to transport bag 101. Carrier drone 107 with the transport bag and associated first coupling means is coarsely positioned behind a trawl 11 based on position data obtained from sensors on trawl 11. Subsequently, carrier drone 107 can activate its multibeam sonar 172 in order to locate and identify a sonar beacon 171 attached to the cod end adapter/nozzle 211. When the beacon has been identified, continuously acquired sonar data are used for positioning carrier drone 107 gradually closer to the cod end adapter/nozzle 211, until physical interconnection can be accomplished.

Figure 19:
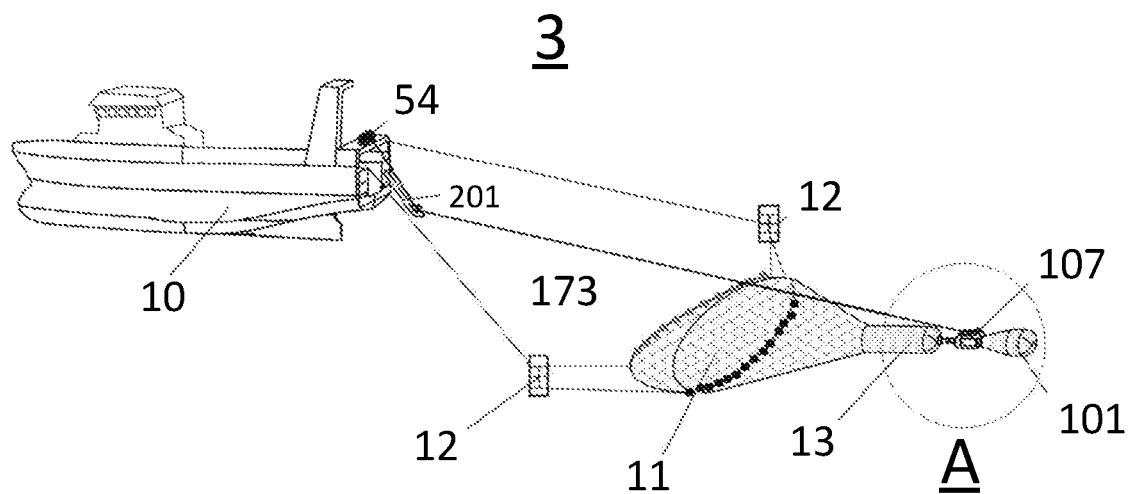
FIG. 19 shows a catch collection system 3 comprising a trawler 10, a trawl 11, a transport bag 101, a carrier drone 107, with the transport bag 101 being coupled to a transport node 251 not shown in the figure.

FIG. 19 shows a catch collection system 3 in a manner similar to FIGS. 16-18, containing the same elements except that in this case, the depot 10 is provided with a pipe 201 for receiving catch. In this figure, catch transport system 4 is connected to cod end 13 via the cod end adapter. A winch 54 for hauling and deploying a catch transport system 4, for example, is shown in depot 10.

Figure 20:
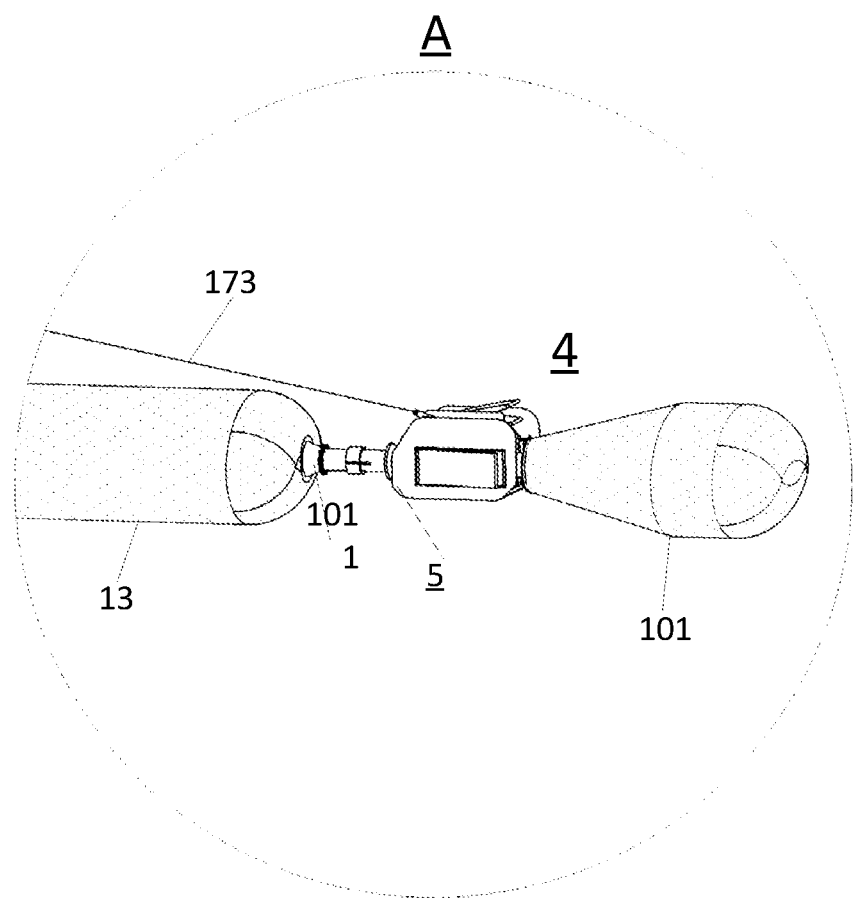
FIG. 20 shows a detail A of the catch collection system of FIG. 19 comprising the catch transport system 4.

FIG. 20 shows a detail A from FIG. 19. Catch transport system 4 is shown connected to a cod end 13 via a cod end nozzle 211. It is seen from the figure that carrier drone 107 is mechanically connected to a depot/ship 10 via line 173, see also FIG. 19. Carrier drone 107 can be released from the transport system 5 to perform additional tasks in a catch handling fleet 1. Line 173 from the depot/ship 10 may be used for hauling the carrier drone in and out.

Transport system 5, when connected to the cod end via cod end nozzle 211, is ready to receive catch from cod end 13. A valve in the connection from the cod end to the nozzle can be opened and closed in order to empty cod end 13 when desirable.

Figure 21:
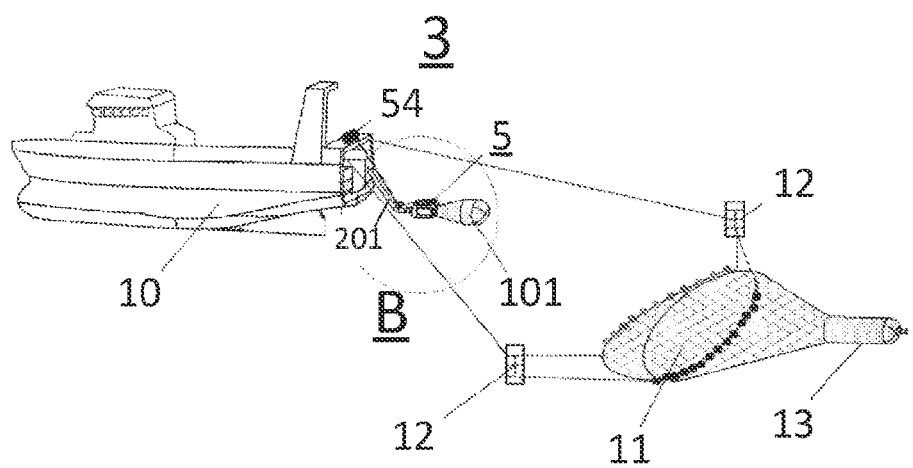
FIG. 21 shows a catch collection system 3 comprising a trawler 10, a trawl 11, and a carrier drone 107 coupled to a transport bag 101 by coupling means, coupled to an unloading point 201 on the trawler 10 for unloading catch.
Figure 22:
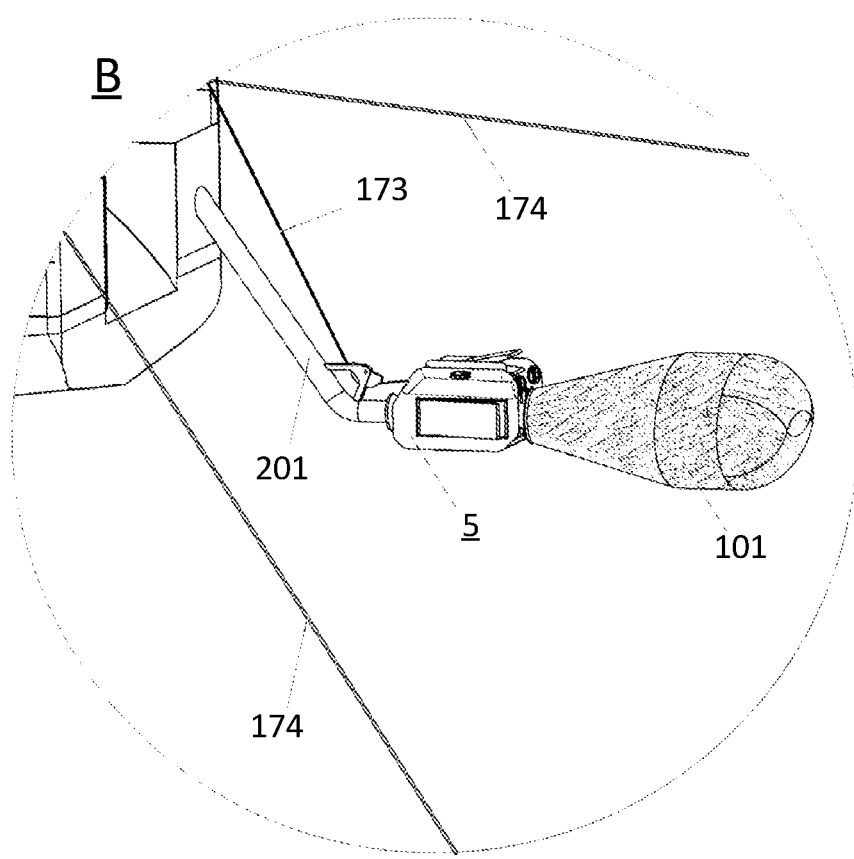
FIG. 22 shows a detail B of catch collection system 3 of FIG. 21 comprising the carrier drone 107 and transport bag 101 connected to the unloading point 201 on trawler 10 by way of coupling means between the unloading point and transport bag 101.

FIG. 22 shows a catch collection system 3 in which a catch transport system 4 is coupled to an unloading point 201. The unloading point is shown located at a ship 10, but in principle the unloading point can be associated with any depot 10 capable of receiving the catch from transport bag 101. Catch transport system 4 can be coupled to unloading point 201 in the same manner as it is connected to a cod end. The depot/ship 10, in the configuration shown in FIG. 21, could be provided with a pump for pumping catch from transport bag 101.

If desirable, carrier drone 107 can be released from the transport system to perform other tasks.

A winch 54 for hauling and towing a main trawl is also shown in the figure.

FIG. 22 shows a detail B from FIG. 21 showing that line 173 is attached to carrier drone 107, allowing the depot/ship 10 to haul in catch transport system 4. Unloading point 201 is seen more clearly to be a pipe. In other configurations, the transport bag may have to be pulled into a trawl hangar in order to be emptied.

Figure 23:
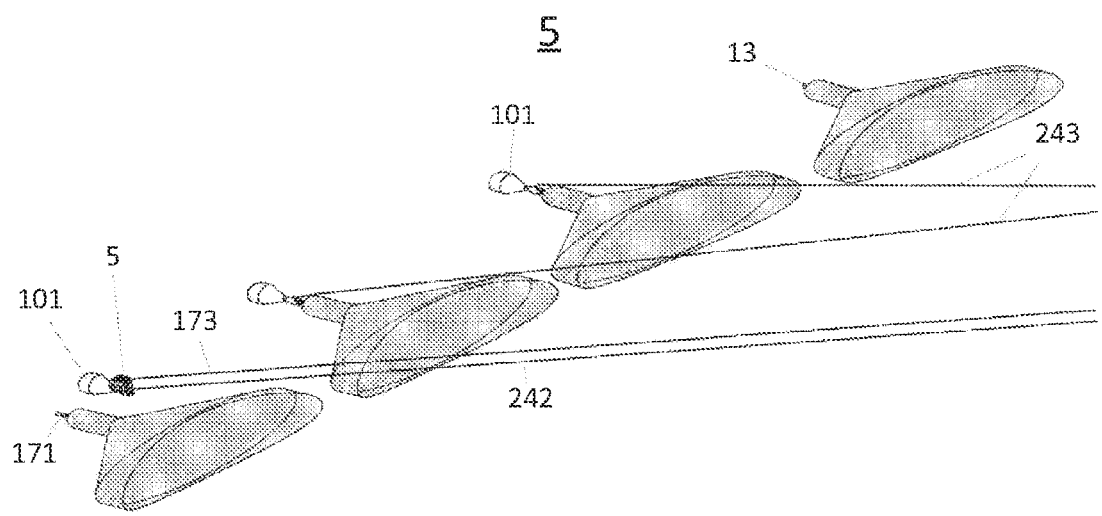
FIG. 23 shows a trawl 11, a catch transport system 4, as well as a transport bag 101 having coupling means in different situations, with the transport bag 101 with coupling means being shown connected to cod ends in two examples.

FIG. 23 shows catch transport system 4 in different situations. In a first situation the catch transport system is shown with two lines 173, 242 heading towards a cod end having one cod end nozzle 211. Line/rope 242 is a carried rope/line of the transport system 242. The line/rope 242 could also be attached in advance to the coupling means coupled to transport bag 101 and adapted for connection to a cod end 13 and to unloading points 201. Rope/line 242 will allow a transport system 5 to be hauled in even though carrier drone 107 has been released from transport system 5. In this manner carrier drone 107 can be made available for performing other tasks.

A second situation is seen above and next to the first situation. In this case transport system 5 is shown connected to a cod end, whereas the carrier drone has been disconnected. A rope/line 243 is attached to transport system 5, which rope/line 243 may correspond to the rope/line 242 carried by catch transport system 4 can be seen attached to transport system 5. The next situation in FIG. 23, the second from the right, is intended to indicate that transport system 5 is ready to be disconnected from the cod end in order to be hauled in. The rightmost figure shows a situation in which the transport system is disconnected from cod end 13.

Figure 24:
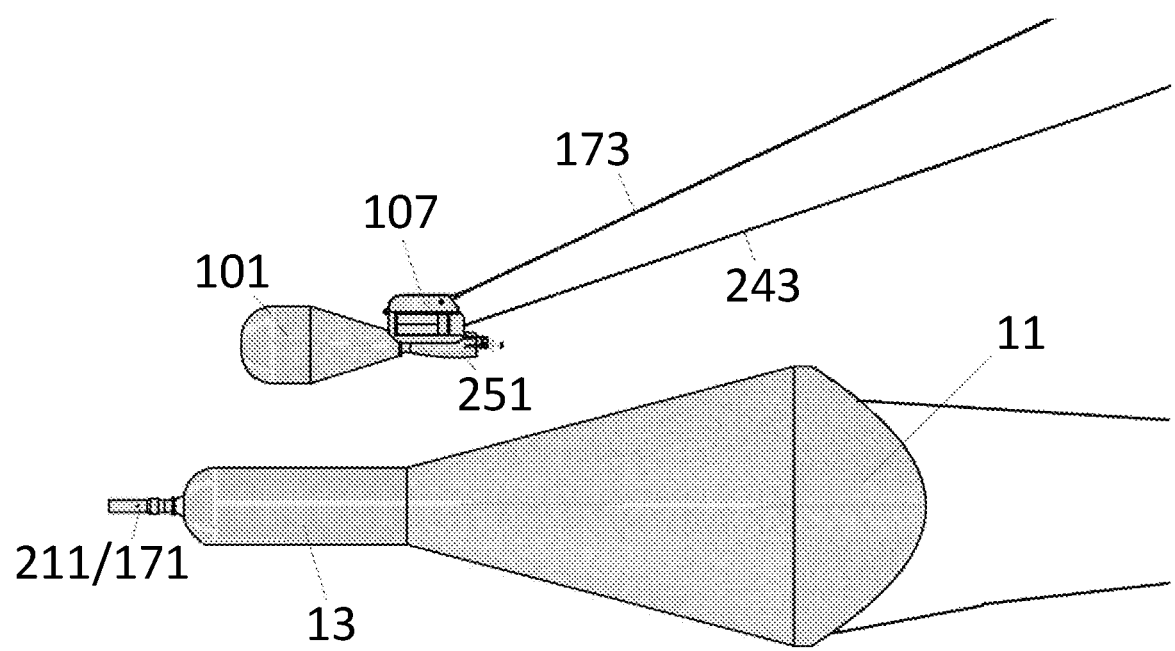
FIG. 24 shows a catch transport system comprising a carrier drone 107 engaged with a transport node 251, which is in turn connected to a transport bag 101, the transport node serving as coupling means for transport bag 101, the catch transport system being in the process of becoming connected to a trawl through a cod end adapter 171 at the cod end 13 of trawl 11.

FIG. 24 shows the first situation from FIG. 23 in detail. The cod end with means 211, 171 for connection to the transport system is clearly seen in the figure. Coupling means 251 for connection to cod end 13 appears from the figure as a separate unit from transport bag 101 and carrier drone 107. In a particular embodiment, coupling means 251 is referred to as a transport node 251. In the figure a line 243 is attached to fastening means 251 while another line/rope 173 is attached to carrier drone 107.

Figure 25:
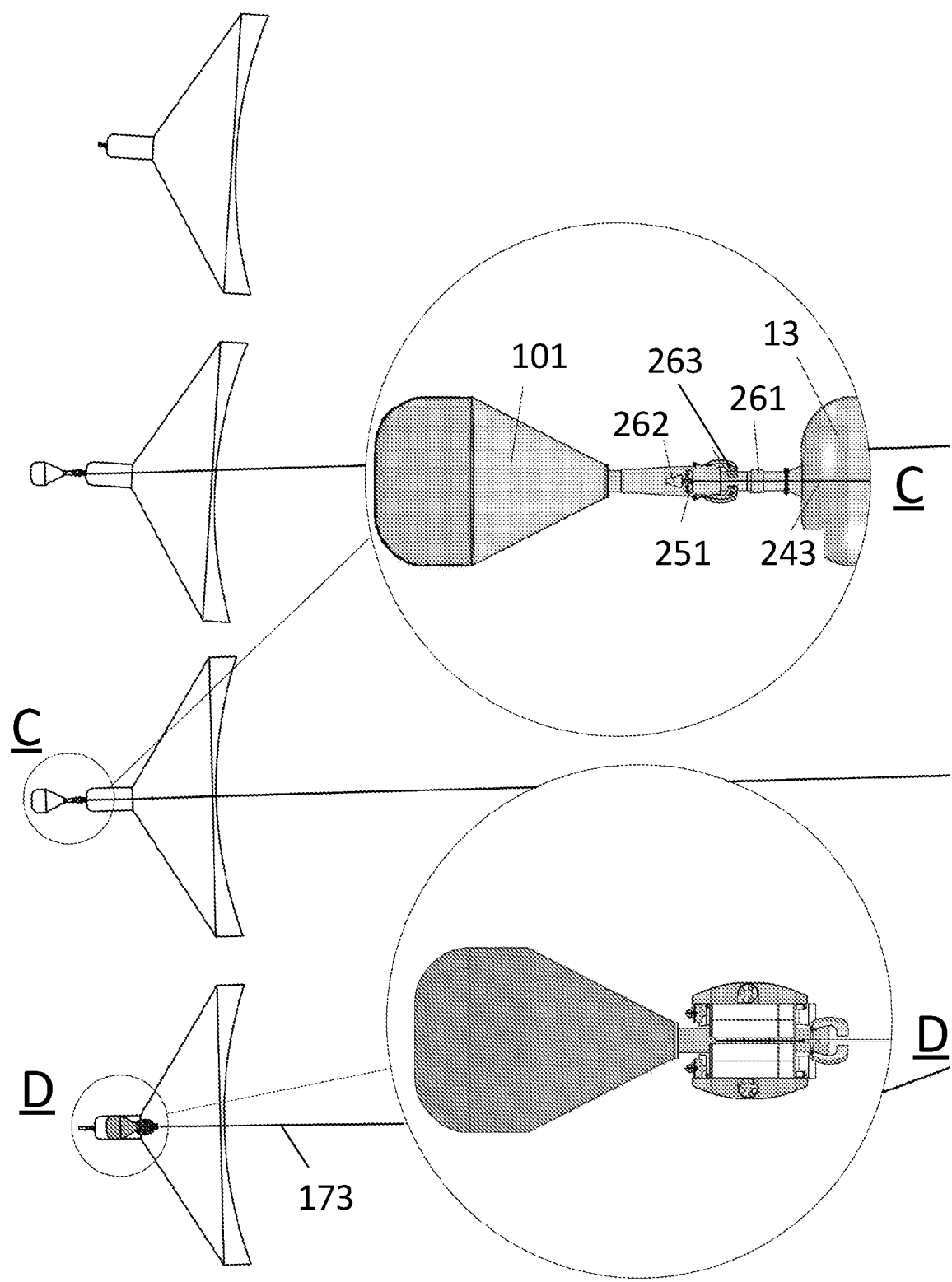
FIG. 25 shows a trawl with a catch transport system and a transport system in different configurations.

FIG. 25, in a manner similar to FIG. 23, shows a catch transport system 4 and a transport system 5 in different situations. The bottom part of the figure, denoted with the letter D, shows a catch transport system 4 in the process of being connected to a cod end.

The neighboring figure above, assigned the letter C, shows that transport system 5 is connected to a cod end. The carrier drone has been released from transport system 5. The part of FIG. 25 denoted with the letter C shows a number of details of transport system 5 and adjacent to transport system 5. A transport bag 101 is seen connected to coupling means. In this case, the coupling means is represented by a transport node having several elements. Reference numeral 262 shows an attachment point for line 243. Gripping means 263 for secure releasable connection to a cod end is shown surrounding a tubular body extending from cod end 13. The figure also shows the cod end adapter with a valve 261, which valve is not shown in detail but functionally serves an opening and closing function. The upper part of the figure shows a trawl where transport system 5 has been disconnected from cod end 13.

Figure 26:
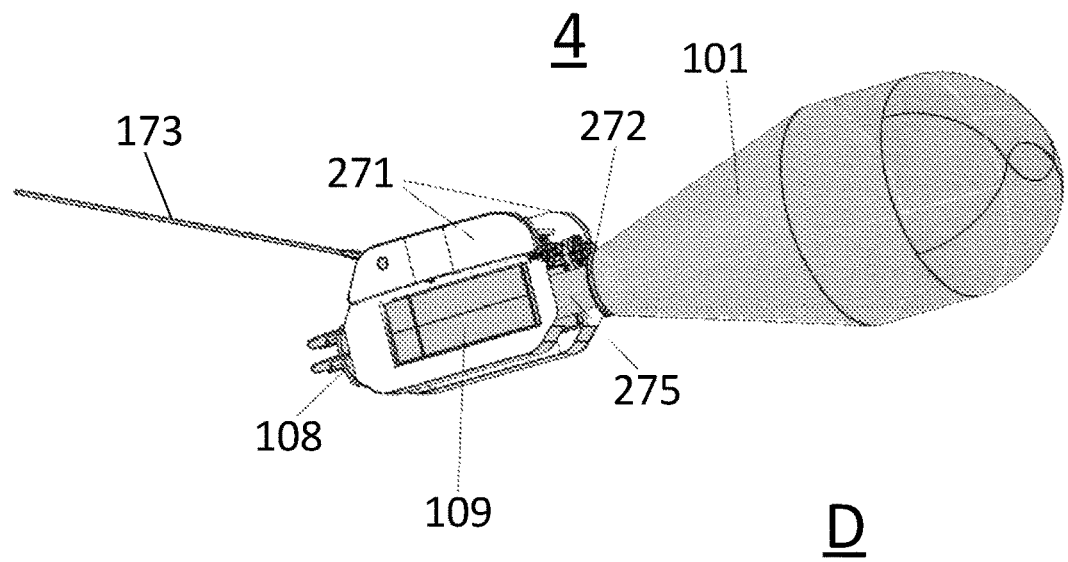
FIG. 26 shows the catch transport system 4 taken from a detail D of FIG. 25.
Figure 26:
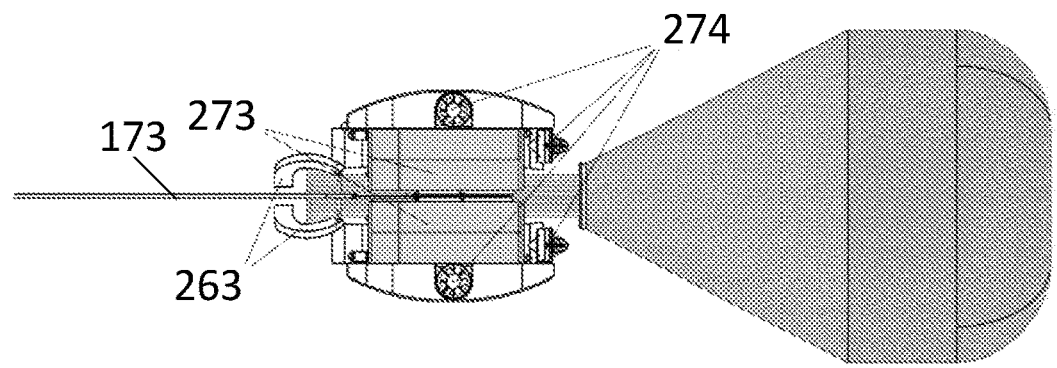

FIG. 26 shows a detail D from FIG. 25 more closely. Catch transport system 4 is shown with its three separable elements, namely transport bag 101, carrier drone 107, and components of the transport node, represented, inter alia, by gripping means 263.

The figure further shows that carrier drone 107 may be provided with maneuvering means 109, 274. In this case, said maneuvering means are represented by one or two rudders 109 on a side of carrier drone 107. Corresponding rudders are provided on the opposite side of carrier drone 107. Also shown are navigation and propulsion means 274 in the form of four thrusters, of which two are used for providing propulsion in a direction substantially horizontal/parallel or partially parallel to line 173. The two remaining thrusters are provided for vertical operation, that is, «lifting and lowering» carrier drone 107. The figure shows further maneuvering means in the form of two top mounted rudders, although only one top mounted rudder could be sufficient. The top mounted rudder may facilitate navigation/maneuvering of carrier drone 107 in a vertical direction.

Figure 27:
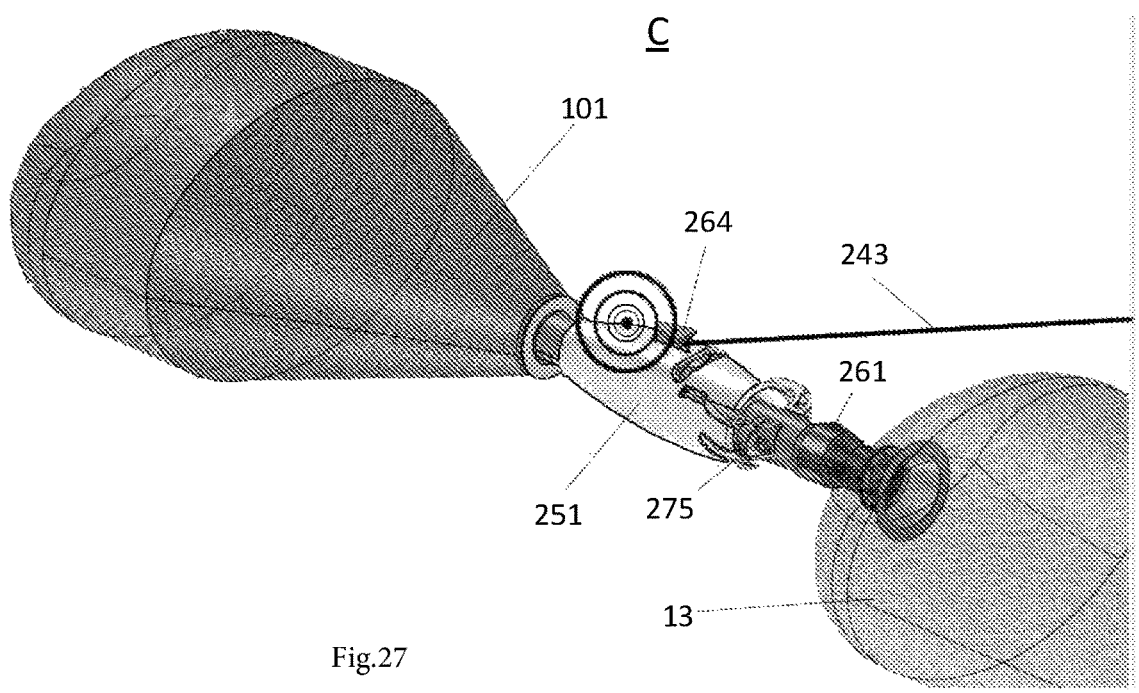
FIG. 27 shows a transport bag 101 connected to a cod end 13 via a transport node 251, with the transport node 251 serving as coupling means between transport bag 101 and cod end 13.

FIG. 27 shows details from section C of FIG. 25. It is seen from the figure that carrier drone 107 has been released from transport system 5. The Figure shows details of a cod end adapter 275/171 protruding from cod end 13 in. Cod end adapter 275/171 is adapted for connection to coupling means. In the figure, said coupling means are implemented in the form of a transport node 251. Transport node 251, which in this example is coupled to a transport bag, is adapted for connecting to cod end adapter 275/171. The transport node includes means for such interconnection, in this case represented by a grip lock for cod end adapter 275/171. The grip lock is remotely controlled from actuators on transport node 251. Transport node 251 itself is remotely controlled via cable 243. Sonar communication can be used for controlling actuators locking the transport node to cod end adapter 275 during docking and that at the same time being operable to trigger a valve 261 for catch on cod end adapter 275/171.

In the figure, the sonar device of transport node 251 is indicated by four rings and a center dot.

The transport node also includes attachment means for connection to a carrier drone, which attachment means is shown as a connection point 264.

Figure 28:
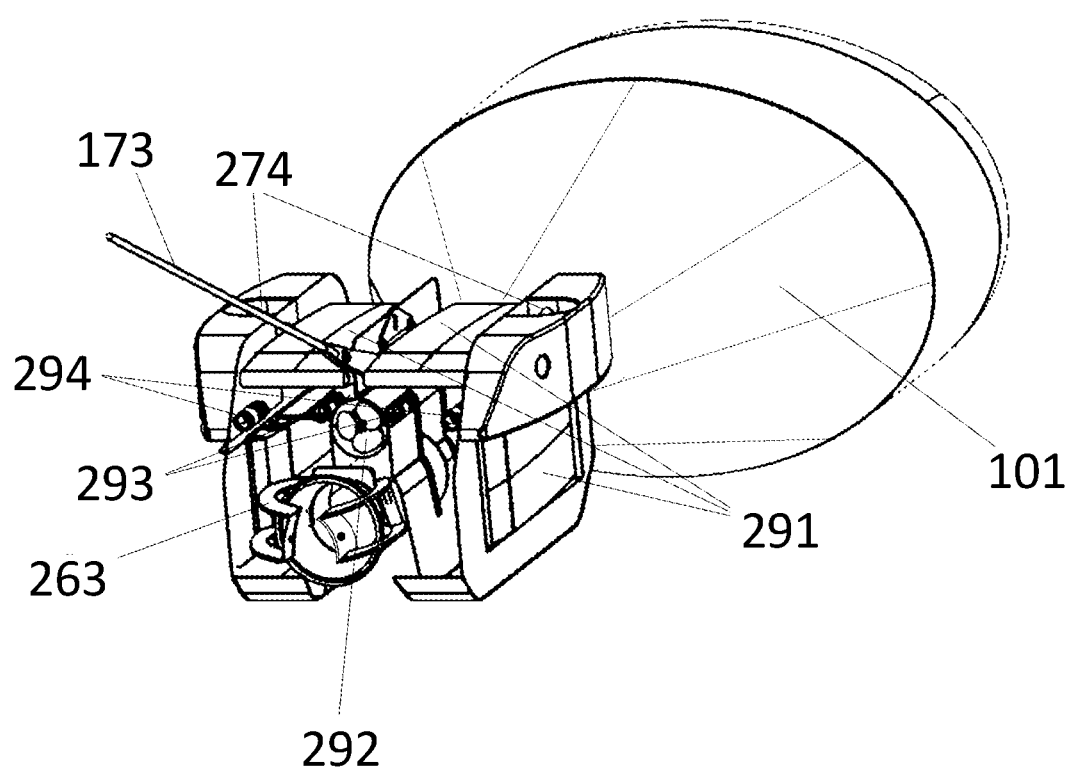
FIG. 28 shows a catch transport system 4.

FIG. 28 shows a catch transport system 4 as seen from the front of a carrier drone and backwards towards a transport bag 101. The figure shows essentially the same elements as FIG. 26. Catch transport system 4 is shown with its three separable elements, namely transport bag 101, carrier drone 107, and components of the transport node, represented by gripping means 263, inter alia.

The figure further shows that the carrier drone may be provided with maneuvering means 274, 291, 293, 294. In the figure, said maneuvering means are represented by one or two rudders 291 at both sides of carrier drone 107, as well as at least one «top rudder» 291 at the top of the carrier drone. Also seen is navigation and propulsion means 274 in the form of two thrusters, which thrusters 274 are provided for vertical operation and substantially vertical operation, that is, «lifting and lowering» carrier drone 107. In the figure, the carrier drone is provided with a camera 293, such as a vision camera. The carrier drone is also shown to include two cameras 294 and two lights 294. The carrier drone may be provided with a generator 292 for charging internal batteries.

Figure 29:
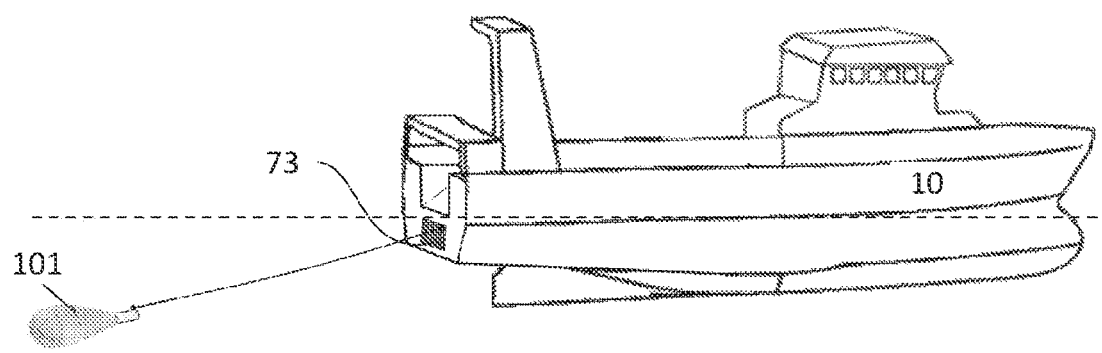
FIG. 29 shows a node hangar for receiving therein transport node 251 and transport bag 101 containing catch collected from an active trawl.

FIG. 29 shows an exemplary hauling of catch in that a transport system 5 having a transport bag 101 containing catch is pulled in towards a slip 73 or trawl hangar of a vessel 10.

Figure 30:
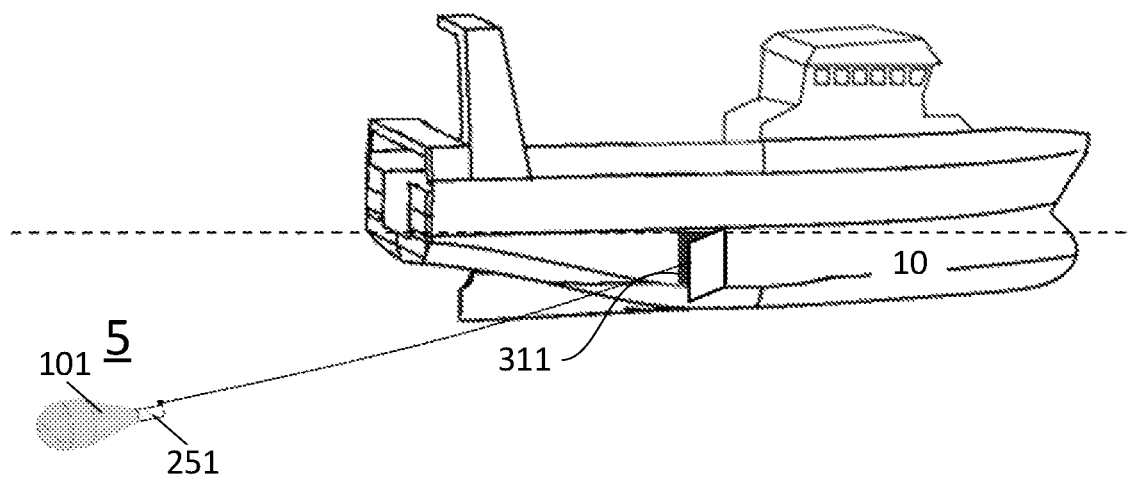
FIG. 30 shows the manner in which transport node 251 with transport bag 101 is towed back to a ship 10 by way of wire and is finally taken into the ship through a port 311 at the broadside below the waterline.

FIG. 30 shows an exemplary hauling of catch in that a transport system 5 having a transport bag 101 containing catch is pulled in towards a trawl hangar 311 with an opening on the side of a vessel 10.

It is fully possible to have an opening into a trawl hangar on both sides of a vessel, and also to have an aft slip as well as one or two side openings into the trawl hangar.

Figure 31:
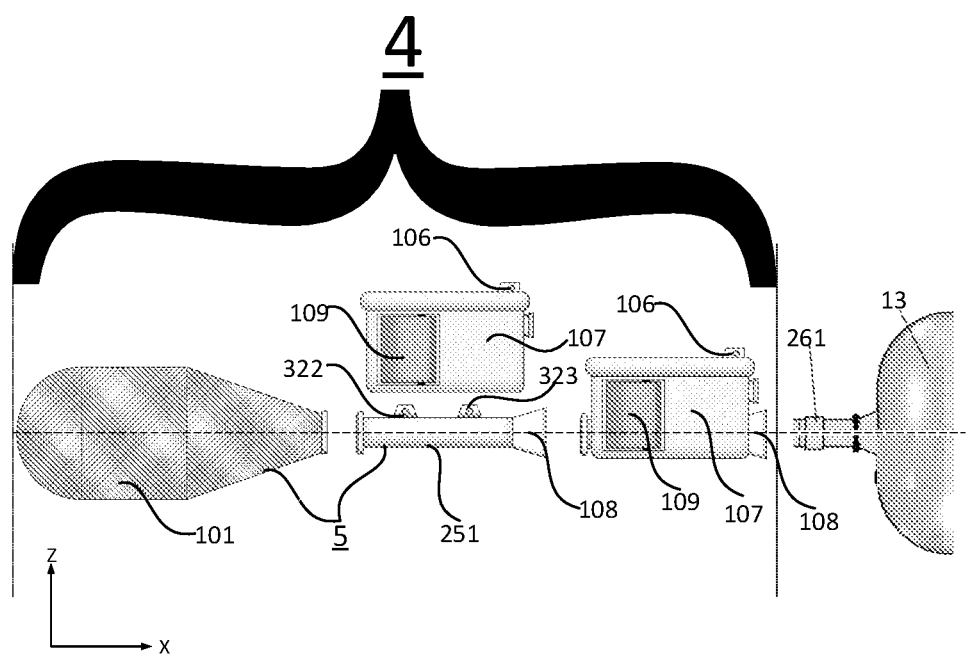
FIG. 31 shows a catch transport system 4 comprising modules for transporting, unloading, and loading of catch.

FIG. 31 shows an exemplary catch transport system 4 in an exploded view of the three main elements of the catch transport system, namely transport bag 101, transport node 251, and carrier drone 107. All these elements are shown in a side view.

In this figure, transport bag 101 is shown without any evident transport node adapter. Nevertheless, transport bag 101 is provided with means enabling releasable connection thereof to transport node 251.

Transport node 251 is shown having a first rear fastening eye 322 and a second front fastening eye 323. The fastening eyes are adapted for attachment of rope/line, cable, or the like. Fastening eyes 322, 323 are exemplary means for physically connecting the transport node to remote units such as winches of depots and the like. The transport node is provided with means for connection to a cod end, said means 108 being illustrated by a nozzle adapted for connection to a cod end or pipe 201 in order to receive catch.

A carrier drone 107 having a side rudder 109 is shown. The back of the carrier drone 107 corresponds to the side seen and is also provided with a side rudder 109. Carrier drone 107 is further provided with fastening means 106 for releasable connection to remote units. In the figure, fastening means 106 is illustrated as a fastening eye 106.

The elements of the figure, as seen from the left and in the x direction, are: transport bag 101, transport node 251, shown underneath a carrier drone 107, carrier drone 107 carrying a transport node. A cod end having a cod end adapter, which does not form part of a catch transport system, is shown to the right of the carrier drone with the transport node.

Figure 32:
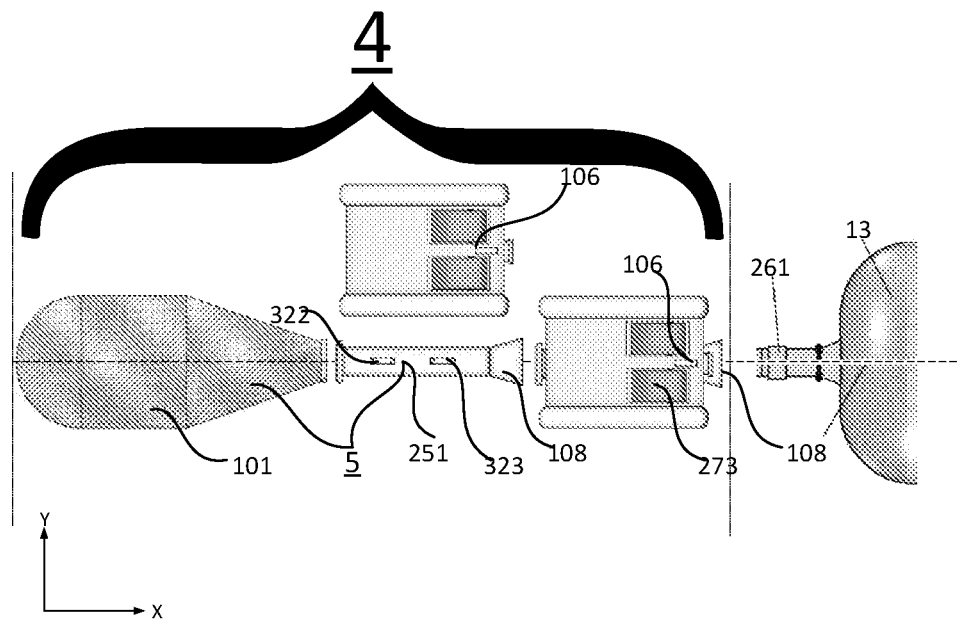
FIG. 32 is a top view of the catch transport system 4 of FIG. 31 comprising modules for transporting, unloading, and loading of catch.

FIG. 32 shows the same elements as FIG. 31 in a top view. From the figure it is seen that carrier drone 107 is provided with two top rudders 273. The remaining elements and features are as in FIG. 31.

Figure 33:
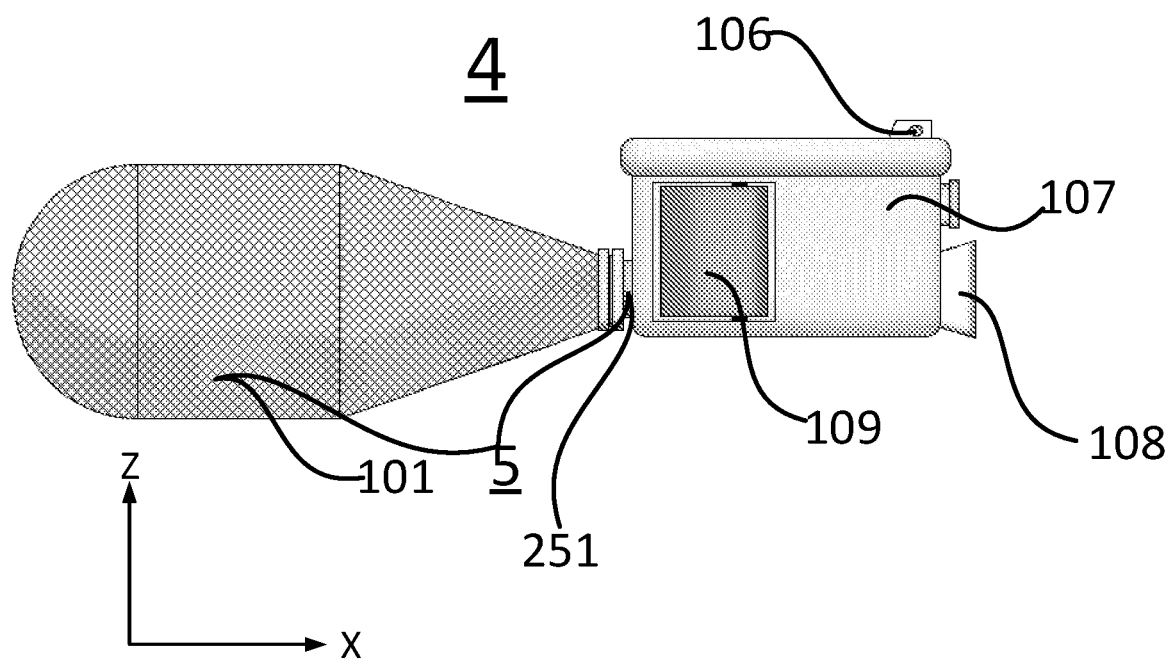
FIG. 33 is a side view of a catch transport system 4 in a connected state.

FIG. 33 shows a catch transport system 5 according to an embodiment of the invention. Catch transport system 5 displays the same elements as shown in FIGS. 31 and 32 as assembled and shown in a side view.

Figure 34:
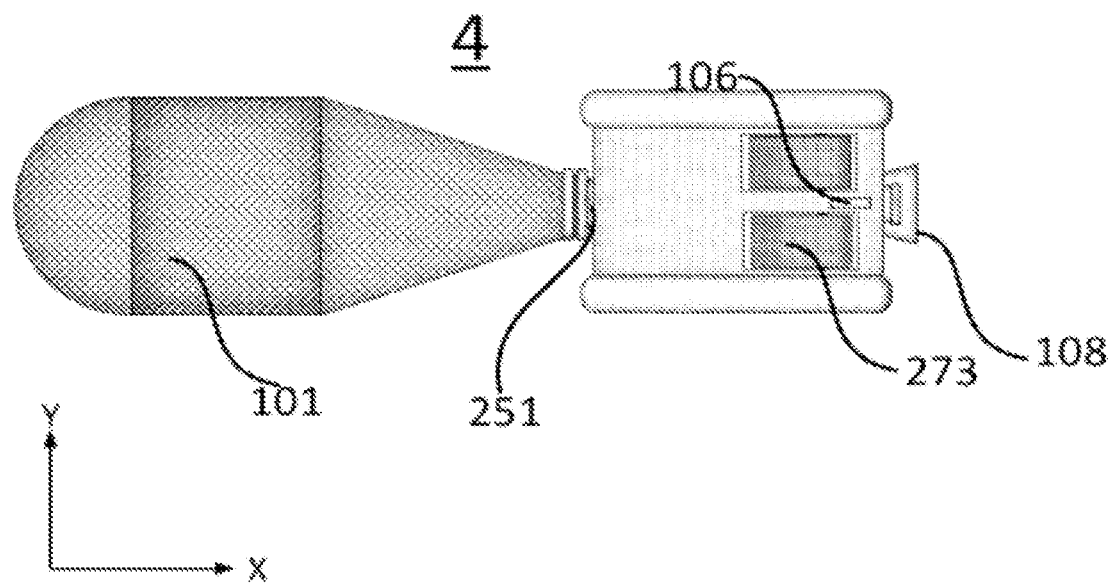
FIG. 34 is a top view of a catch transport system 4 in a connected state.

FIG. 34 shows the catch transport system of FIG. 33 in a top view.

Figure 35:
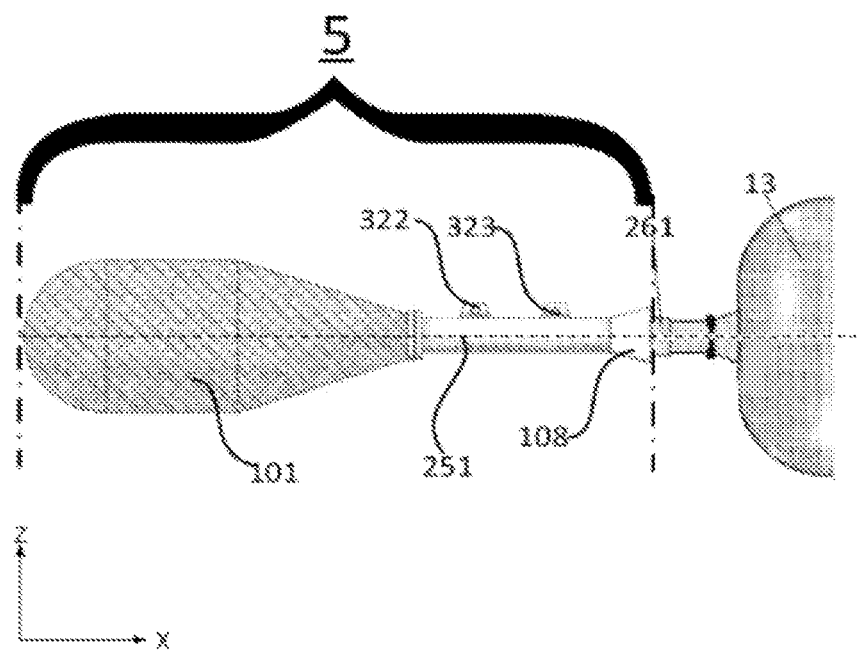
FIG. 35 shows a transport system 5 including a transport node 251 with a transport bag 101 connected to a cod end 13.

FIG. 35 shows a transport system 5 coupled to a cod end. The same elements as shown in FIG. 31 enter the figure, except for carrier drone 107.

| 1 | Catch handling fleet, |
|---|---|
| 2 | Catch handling system forming part of a catch handling fleet 1, modular catch handling system forming part of a catch handling fleet 1. |
| 3 | Catch collection system |
| 4 | Catch transport system |
| 5 | Transport system |
| 10 | Vessel, ship, boat, trawler, main trawler |
| 11 | Trawl, main trawl |
| 12 | Otter board |
| 13 | Cod end |
| 31 | Co-trawler, manned, remotely controlled and/or autonomous co-trawler of catch handling fleet |
| 32 | Vessel that collects/receives/processes catch in a catch handling fleet |
| 51 | Winches for controlling roundsling 53 |
| 52 | Leading block of roundsling 53 for coarse positioning of autonomous and/or controlled vessel 107 |
| 53 | Roundsling 53 between main trawler 10 and co-trawler 31 |
| 54 | Cable winch |
| 61 | Communication device |
| 62 | Communication device |
| 63 | Communication device |
| 64 | Communication device |
| 65 | Communication device |
| 71 | Cod end adapter |
| 72 | Mini trawl |
| 73 | Aft slip of vessel 10, trawl hangar |
| 74 | Otter boards of mini trawl 72 |
| 75 | Navigation node |
| 76 | Adjustable length wire between otter boards 74 and navigation node 75 |
| 77 | Towing wire for mini trawl 72 |
| 91 | Valve for catch on cod end adapter 261 for transferring catch |
| 91 | Fish container, recovery bag |
| 92 | Towing means for recovery bag (wire, pipe, line, hose, etc) |
| 101 | Transport bag, transport bag for catch |
| 102 | Valve for loading catch into recovery bag, among other places |
| 103 | Piping for unloading/pumping |
| 104 | Catch contained in recovery bag |
| 105 | Nozzle of pipe/hose system for unloading catch from recovery bag 91 |
| 106 | Fastening eye of carrier drone 107 |
| 106 | Fastening eye for cable/wire 173 of craft 107. |
| 107 | Carrier drone, controlled or autonomous craft, RC, drone, AUV/TOV, humla |
| RC | Remote Controller |
| AUV | Autonomous underwater vehicle |
| TOV | Tele-Operated Vehicle |
| 108 | Nozzle of transport node 251 towards cod end 13 |
| 108 | Nozzle of transport node 251 for coupling to cod end adapter 261 and unloading point |
| 109 | Side rudder for navigation |
| 134 | Towing wire for recovery bag 91 |
| 146 | Hose sent from ship for emptying fish container 91 via piping 103 |
| 157 | Catch contained in hose/pipe for transport to receiving ship/storage |

-continued

| 163 | First pipe/hose module of hose/pipe 146 |
|---|---|
| 164 | Second pipe/hose module of hose/pipe 146 |
| 165 | Third pipe/hose module of hose/pipe 146 |
| 166 | Fourth pipe/hose module of hose/pipe 146 |
| 167 | Fifth pipe/hose module of hose/pipe 146 |
| 168 | Sixth pipe/hose module of hose/pipe 146 |
| 169 | Seventh pipe/hose module of hose/pipe 146 |
| 171 | Cod end adapter with sonar beacon |
| 172 | Working and scanning area of multibeam sonar |
| 173 | Cable to vessel, wire for controlled and/or autonomous craft 107. |
| 174 | Trawl wire |
| 201 | Pipes for receiving catch |
| 211 | Nozzle of cod end 13 |
| 242 | Carried rope for transport bag 101 |
| 243 | Rope for transport bag 101 |
| 251 | Transport node |
| 261 | Cod end adapter with valve |
| 263 | Grip lock for cod end adapter 261 and catch receptacle, remotely controlled gripper and actuator of transport node 251 for attachment to cod end adapter 261 |
| 264 | Connection point for carrier drone 107 (TOV/AUV) |
| 271 | Buoyancy elements |
| 272 | Quick release coupling for connecting transport bag 101 to remotely controlled transport node 251 |
| 273 | Elevator for navigation and stabilization |
| 274 | Propulsion and/or positioning propellers, propeller thrusters |
| 275 | Pipe body for remotely controlled transport node with attached transport bag 101 |
| 291 | Rudder for turning and height positioning, as well as stabilization |
| 292 | Generator for charging internal batteries during towing |
| 293 | Vision camera and sonar scanner for navigation |
| 294 | Light and camera |
| A | Detail |
| B | Detail |
| C | Detail |
| D | Detail |
| 311 | Trawl hangar with opening in vessel side |
| 322 | First (rear) fastening eye of transport node 251 |
| 323 | Second (front) fastening eye of transport node 251 |

The invention claimed is:

1. A catch handling system comprising:
    at least one catch collection system comprising:
        a catch handling depot,
        one or more trawls, and
        at least a catch transport system,
    wherein said catch transport system comprises at least a transport system,
    wherein the transport system comprises a transport node comprising means for releasable connection to a catch handling fleet carrier drone, such that the catch handling fleet carrier drone can be released from the transport node and via a releasable cable attachable to fastening means on the catch handling fleet carrier drone to be connected to remote units,
    wherein a trawl vessel pulls the trawl,
    wherein a cod end comprises means for releasable connection to the transport node, and
    wherein said means for releasable connection to the transport node is a remotely controlled dump valve at the back of the cod end.

2. The catch handling system according to claim 1, wherein the catch transport system further comprises a catch handling fleet carrier drone.

3. The catch handling system according to claim 2, wherein the catch handling fleet carrier drone is configured to carry the transport system and to be releasably connected with the transport system.

4. The catch handling system according to claim 1, wherein said catch handling depot is at least one of a trawl vessel, a factory ship, a fish reception facility, or a recovery bag.

5. The catch handling system according to claim 1, wherein said catch handling system further comprises a recovery bag.

6. The catch handling system according to claim 1, wherein said transport system further comprises a transport bag.

7. The catch handling system according to claim 6, wherein said transport node includes means for releasable connection to said transport bag.

8. The catch handling system according to claim 1, wherein said catch handling fleet carrier drone comprises means for carrying said transport node.

9. A catch collection system comprising:
at least a catch handling depot,
one or more trawls, and
at least a catch transport system, said catch transport system comprising at least a transport system, said transport system comprising a transport node comprising means for releasable connection to a catch handling fleet carrier drone, such that the catch handling fleet carrier drone can be released from the transport node and via a releasable cable attached to fastening means on the catch handling fleet carrier drone connected to remote units,
wherein the catch handling fleet carrier drone further comprises at least one of a side rudder, at least one thruster/propeller for providing propulsion in a Z direction, at least one thruster/propeller for providing propulsion in an X direction, at least one buoyancy element, at least one elevator, and at least one means for controlling the catch handling fleet carrier drone.

10. The catch collection system according to claim 9, wherein the catch handling fleet carrier drone is configured to carry the transport system and to be releasably connected with the transport system.

11. The catch collection system according to claim 9, wherein said catch collection depot is storage means of a vessel, the vessel being at least one of a trawl vessel, factory ship for receiving catch, or a pair trawl vessel.

12. The catch collection system according to claim 9, wherein said catch handling system further comprises a recovery bag.

13. The catch collection system according to claim 12, wherein said recovery bag comprises means for releasable connection to one or more units of the catch collection system.

14. The catch collection system according to claim 13, wherein said means for releasable connection is arranged at a first end of the recovery bag and is configured for releasable connection to said transport bag in order to receive catch from said transport bag.

15. A catch handling fleet carrier drone comprising:
means for releasably carrying a transport node;
one or more navigation means for navigating the catch handling fleet carrier drone;
one or more propulsion means for propelling the catch handling fleet carrier drone; and
one or more means for releasably and physically connecting the catch handling fleet carrier drone to units at a distance from the catch handling fleet carrier drone,
wherein the catch handling fleet carrier drone further comprises at least one of a side rudder, at least one thruster/propeller for providing propulsion in a Z direction, at least one thruster/propeller for providing propulsion in an X direction, at least one buoyancy element, at least one elevator, and at least one means for controlling the catch handling fleet carrier drone.

16. The catch handling fleet carrier drone according to claim 15, wherein the catch handling fleet carrier drone further comprises one or more propellers for providing propulsion and positioning.

\* \* \* \* \*